US012175222B1

(12) United States Patent
Benfield et al.

(10) Patent No.: US 12,175,222 B1
(45) Date of Patent: Dec. 24, 2024

(54) CONVERTING QUASI-AFFINE EXPRESSIONS TO MATRIX OPERATIONS

(71) Applicant: Amazon Technologies, Inc., Seattle, WA (US)

(72) Inventors: Michael Ray Benfield, Redwood City, CA (US); Hongbin Zheng, San Jose, CA (US); Thomas Robert Norell, Morganton, NC (US)

(73) Assignee: Amazon Technologies, Inc., Seattle, WA (US)

( * ) Notice: Subject to any disclaimer, the term of this patent is extended or adjusted under 35 U.S.C. 154(b) by 1040 days.

(21) Appl. No.: 16/949,958

(22) Filed: Nov. 20, 2020

(51) Int. Cl.
*G06N 3/084* (2023.01)
*G06F 8/41* (2018.01)
*G06N 3/04* (2023.01)
*G06F 17/16* (2006.01)

(52) U.S. Cl.
CPC ............. *G06F 8/44* (2013.01); *G06N 3/04* (2013.01); *G06N 3/084* (2013.01); *G06F 17/16* (2013.01)

(58) Field of Classification Search
CPC ........................................................ G06F 8/44
USPC ........................................................ 706/15
See application file for complete search history.

(56) References Cited

U.S. PATENT DOCUMENTS

| | | | | |
|---|---|---|---|---|
| 2018/0018556 A1* | 1/2018 | Young | ................ | G06N 3/063 |
| 2019/0034783 A1* | 1/2019 | Liu | ................ | G06N 3/043 |
| 2019/0042935 A1* | 2/2019 | Deisher | ................ | G06N 3/044 |
| 2019/0201106 A1* | 7/2019 | Siemionow | ................ | G06T 7/70 |
| 2019/0325315 A1* | 10/2019 | Ioffe | ................ | G06N 3/048 |
| 2020/0160156 A1* | 5/2020 | Sarin | ................ | G06N 3/063 |
| 2020/0184311 A1* | 6/2020 | Zhang | ................ | G06F 16/24578 |
| 2020/0226451 A1* | 7/2020 | Liu | ................ | G06N 3/082 |
| 2020/0285956 A1* | 9/2020 | Bouchard | ................ | G06F 17/16 |
| 2020/0380675 A1* | 12/2020 | Golden | ................ | G06T 7/143 |
| 2020/0387783 A1* | 12/2020 | Bagherinezhad | ................ | G06F 16/90335 |
| 2021/0012206 A1* | 1/2021 | Sikka | ................ | G06N 3/08 |
| 2021/0034982 A1* | 2/2021 | Sather | ................ | G06N 3/082 |
| 2021/0073643 A1* | 3/2021 | Partovi Nia | ................ | G06N 3/045 |
| 2021/0350228 A1* | 11/2021 | Wang | ................ | G06N 3/048 |
| 2021/0358564 A1* | 11/2021 | Feinberg | ................ | G06N 20/10 |
| 2022/0028155 A1* | 1/2022 | Li | ................ | G06T 1/20 |

(Continued)

OTHER PUBLICATIONS

Siraj Patel, "Building neural network in 4 minutes", available online at [https://www.youtube.com/watch?v=h3l4qz76JhQ], published on Apr. 4, 2016. (Year: 2016).*

(Continued)

*Primary Examiner* — Reza Nabi

(74) *Attorney, Agent, or Firm* — Weaver Austin Villeneuve & Sampson LLP

(57) ABSTRACT

A computer-implemented method includes generating, based on a representation of a tensor mapping between an input tensor and an output tensor, a list of mappings from elements of the input tensor to elements of the output tensor, and generating groups of mappings from the list of mappings, where each of the groups of mappings corresponds to a respective set of matrix multiplications, a matrix transpose, or both. The computer-implemented method also includes generating a respective expression for each of the groups of mappings and generating code for summing results of the respective expressions, where each respective expression includes the respective set of matrix multiplications, the matrix transpose, or both.

16 Claims, 14 Drawing Sheets

(56) References Cited

U.S. PATENT DOCUMENTS

2022/0100962 A1\* 3/2022 Akhalwaya ............... G06N 3/08
2022/0108149 A1\* 4/2022 Sohl-Dickstein ........ G06N 3/04
2023/0071424 A1\* 3/2023 Kibardin ............... G06F 18/214

OTHER PUBLICATIONS

CS-Swift, "How to Represent a Neural Network with Matrices", available online at [https://www.youtube.com/watch?v=IFOOjeH2wsY], published on Jan. 22, 2019 (Year: 2019).\*

\* cited by examiner $O(m, n) = A(m, i) \times M \times B(j, n)$
$O[m, n] = M[i, j]$ $O(0, 1) = A(0, 1) \times M \times B(2, 1)$
$O[0, 1] = M[1, 2]$ $$\begin{bmatrix} 0 & 6 & 0 \\ 0 & 0 & 0 \\ 0 & 0 & 0 \end{bmatrix} = \begin{bmatrix} 0 & 1 & 0 \\ 0 & 0 & 0 \\ 0 & 0 & 0 \end{bmatrix} \begin{bmatrix} 1 & 2 & 3 \\ 4 & 5 & 6 \\ 7 & 8 & 9 \end{bmatrix} \begin{bmatrix} 0 & 0 & 0 \\ 0 & 0 & 0 \\ 0 & 1 & 0 \end{bmatrix}$$

$$= \begin{bmatrix} 4 & 5 & 6 \\ 0 & 0 & 0 \\ 0 & 0 & 0 \end{bmatrix} \begin{bmatrix} 0 & 0 & 0 \\ 0 & 0 & 0 \\ 0 & 1 & 0 \end{bmatrix}$$

$$= \begin{bmatrix} 0 & 6 & 0 \\ 0 & 0 & 0 \\ 0 & 0 & 0 \end{bmatrix}$$

FIG. 7

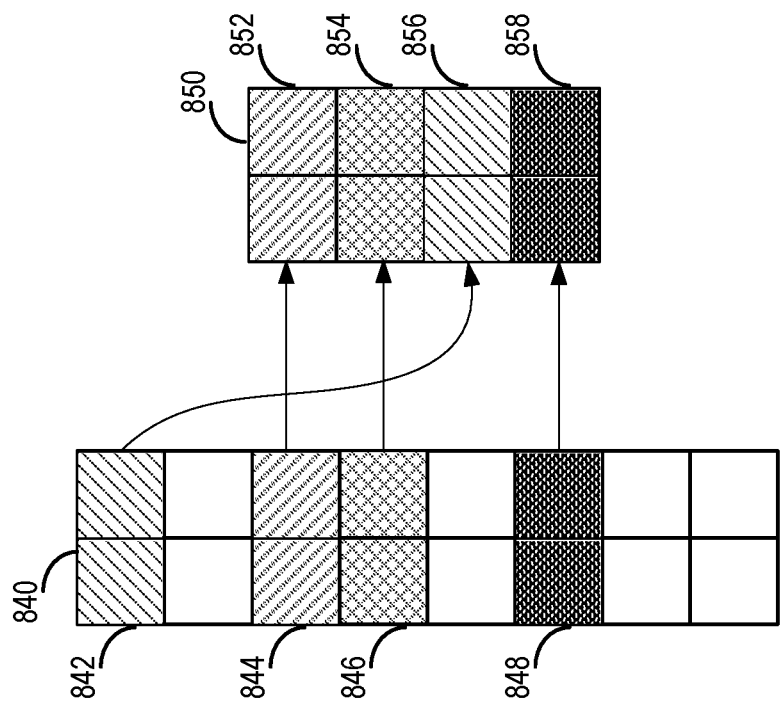
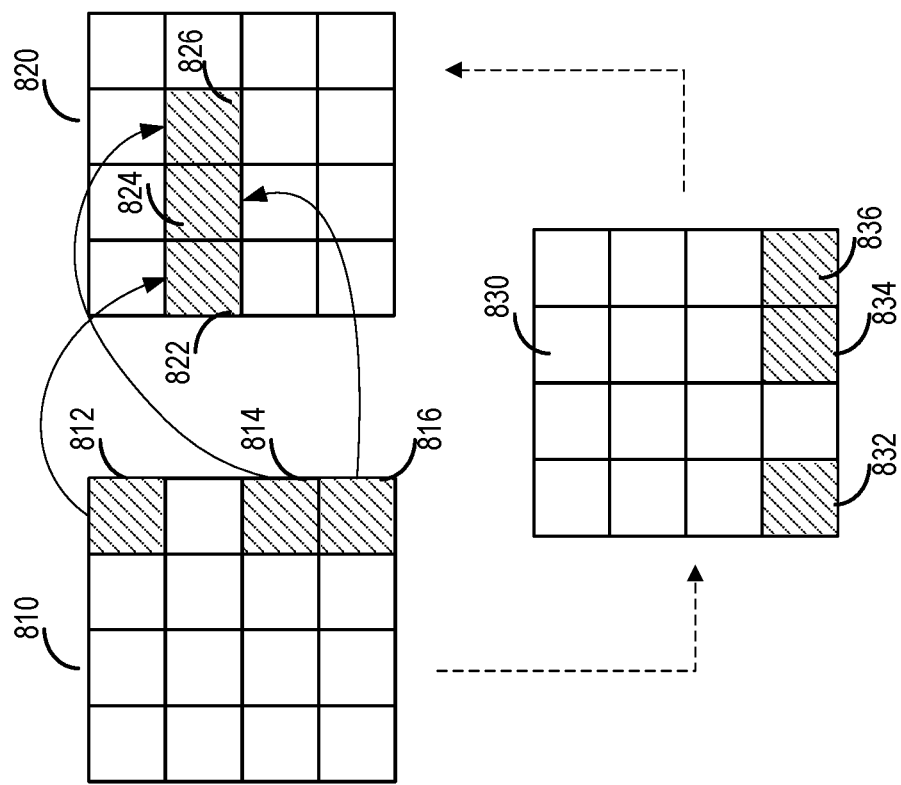
FIG. 8B
FIG. 8A

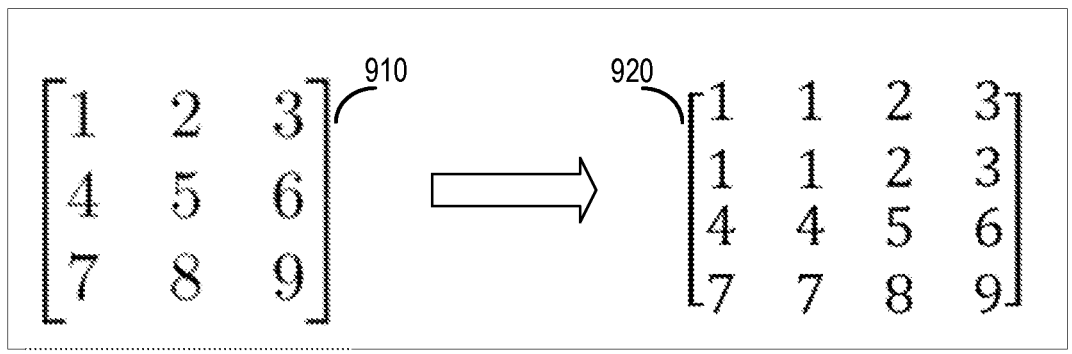
FIG. 9A
```
Input_tensor = [
    [1, 2, 3],
    [4, 5, 6],
    [7, 8, 9]
    ]
output_tensor = [
    [0, 0, 0, 0,],
    [0, 0, 0, 0,],
    [0, 0, 0, 0,],
    [0, 0, 0, 0,]
    ]
for i = 0, i < 4, i++ {
    for j = 0, j < 4, j++ {
      output_tensor[i][j] =
           input_tensor[(i * 2) // 3][(j* 2) // 3]
    }
}
```
FIG. 9B
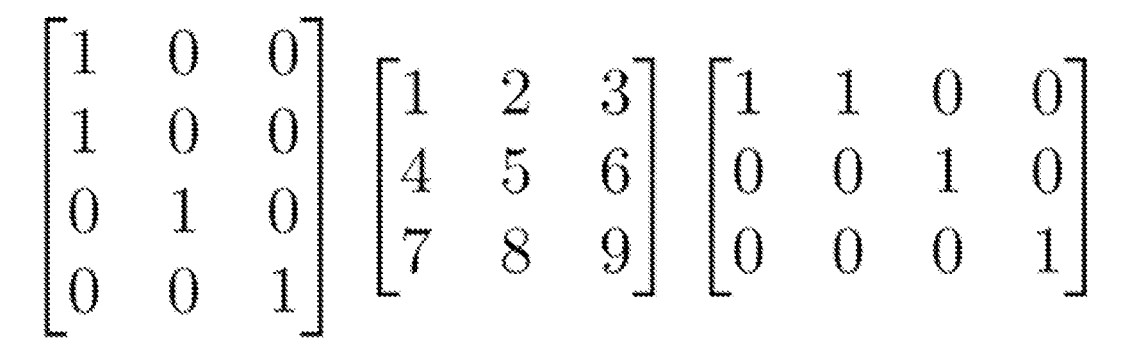
FIG. 9C

CONVERTING QUASI-AFFINE EXPRESSIONS TO MATRIX OPERATIONS

BACKGROUND

Artificial neural networks are computing systems with an architecture based on biological neural networks. Artificial neural networks can be trained using training data to learn how to perform certain tasks, such as identifying or classifying physical objects, activities, characters, or the like, from images or videos. An artificial neural network may include multiple layers of processing nodes. Each processing node on a neural network layer can perform computations on input data to generate output data. The processing nodes on a neural network layer may perform a set of operations, such as filtering, pooling, transformation, up-sampling, down-sampling, and the like, to generate an output tensor from an input tensor.

BRIEF DESCRIPTION OF THE DRAWINGS

Various embodiments in accordance with the present disclosure will be described with reference to the drawings, in which:

FIG. 7 illustrates an example of using a pair of matrix multiplications to index a two-dimensional tensor;

FIG. 8A illustrates an example of tensor indexing using matrix multiplications according to certain embodiments;

FIG. 8B illustrates an example of executing a gather operator using matrix multiplications according to certain embodiments;

FIG. 9A illustrates an example of mapping an input tensor to an output tensor;

FIG. 9B illustrates an example of a representation of the mapping of FIG. 9A in a programming language;

FIG. 9C illustrates an example of using matrix multiplications to perform the mapping of FIG. 9A according to certain embodiments;

DETAILED DESCRIPTION

Figure 1:
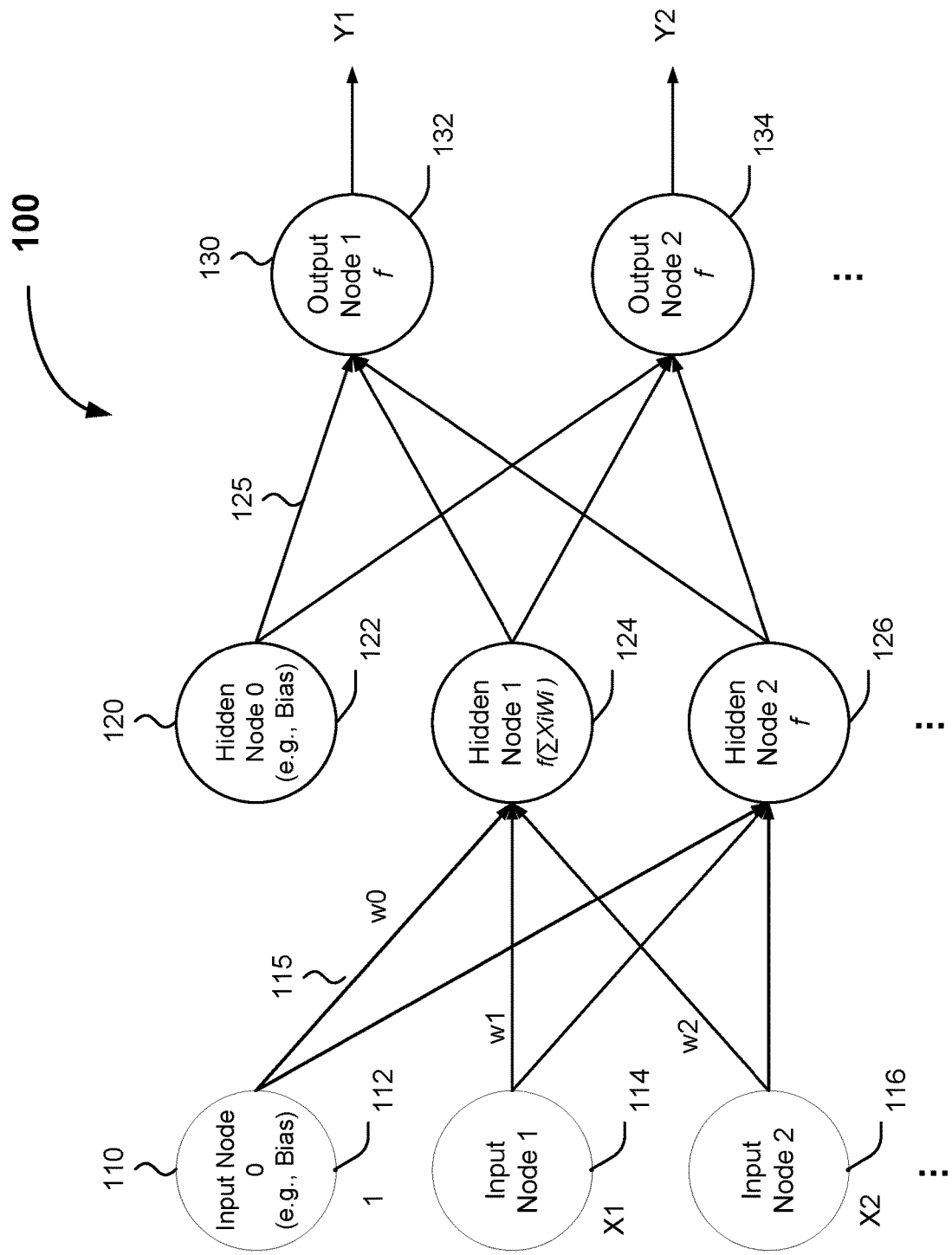
FIG. 1 illustrates an example of a multi-layer artificial neural network.

Techniques disclosed herein relate generally to artificial neural networks, and more specifically, to tensor indexing in artificial neural networks. Various inventive embodiments are described herein, including systems, circuits, devices, methods, processes, computer-readable storage medium, code, instructions, programs, and the like.

An artificial neural network generally includes processing nodes arranged on two or more layers. Processing nodes on a neural network layer may perform various operations, such as filtering, linear transformation, non-linear transformation, down-sampling, up-sampling, pooling, and the like, to map an input feature map (e.g., an input tensor) to an output feature map (e.g., an output tensor). These operations may use mathematical operations, such as multiplications, summations, subtractions, divisions, floor divisions, modulo operations, and the like, to select particular elements or slices of a tensor (which may be referred to as tensor indexing), map particular tensor elements of the input tensor to desired elements or slices in the output tensor, and/or perform mathematical calculations on selected tensor elements or slices. In many complex tensor indexing operations, such as up-sampling or back-propagation during a training process, quasi-affine expressions (e.g., including division or modulo operations) may be performed to index the tensor elements. The quasi-affine expressions may not be efficiently evaluated by a processing unit, such as one including a systolic array optimized for matrix multiplication. Thus, the evaluation of the quasi-affine expressions by the processing unit may take a longer time or may use more computing resources than evaluating an affine expression. As such, the tensor indexing may not have fixed delays and may not be efficiently performed by the processing unit.

According to certain embodiments, a compiler may analyze the representation of a neural network, and convert the tensor indexing described using quasi-affine expressions (e.g., including integer divisions, floor divisions, or modulo operations) in the representation to matrix multiplications, matrix transposes, and/or matrix summations, such that the tensor indexing can be performed more efficiently with approximately the same processing time using a processing unit that may be optimized for matrix multiplications and accumulations.

In one example, a compiler may generate, based on a representation of a tensor mapping (e.g., in a programming language, such as Python), a list of mappings from elements of an input tensor to elements of an output tensor, where the representation of the tensor mapping may include at least one of an integer division, a floor division, or a modulo operation. Each mapping in the list of mappings may map an element of the input tensor to an element of the output tensor and may be represented by a pair of matrix multiplications. The compiler may then generate, from the list of mappings, groups of mappings, where each of the groups of mappings may be performed by a respective set of matrix multiplications, a matrix transpose, or both. The grouping can be based on, for example, the source row or column of the input tensor elements and the destination row or column of the output tensor elements. In one example, the mappings of elements in a same row of the input tensor to elements in a same row or column of the output tensor may be grouped together as they may be performed using a same set of matrix multiplications or matrix transpose. The compiler may further fuse the groups of mappings, for example, based on the left or right matrices used to perform the groups of mappings, to reduce the total number of groups. In some embodiments, the largest groups in the groups of mappings may be selected to cover all mappings in the list and to further reduce the total number of groups.

The complier may then generate a code expression for each of the selected groups, where the code expression may include a set (e.g., one or two) of matrix multiplications, a matrix transpose, or both, which can be efficiently performed by a processing element array and/or other circuits of an accelerator or processing unit. The results of the code expression for the groups of mappings may be summed to generate the output tensor. In this way, tensor indexing may be efficiently performed by the processing unit using affine expressions that do not include divisions or modulo operations, such as matrix multiplications, summations, and/or transposes. The processing time for performing the tensor indexing may also be within a known and/or approximately same period of time.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Artificial neural networks (also referred to as "neural networks") have been used in machine learning research and industrial applications and have achieved many breakthrough results in, for example, image recognition, speech recognition, computer vision, text processing, and the like. An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer.

FIG. 1 illustrates an example of a multi-layer neural network 100. Multi-layer neural network 100 may include an input layer 110, a hidden (or intermediate) layer 120, and an output layer 130. In many implementations, multi-layer neural network 100 may include two or more hidden layers and may be referred to as a deep neural network. A neural network with a single hidden layer may generally be sufficient to model any continuous function. However, such a network may need an exponentially larger number of nodes when compared to a neural network with multiple hidden layers. It has been shown that a deeper neural network can be trained to perform much better than a comparatively shallow network.

Input layer 110 may include a plurality of input nodes (e.g., nodes 112, 114, and 116) that may provide information (e.g., input data) from the outside world to the network. The input nodes may pass on the information to the next layer, and no computation may be performed by the input nodes. Hidden layer 120 may include a plurality of nodes, such as nodes 122, 124, and 126. The nodes in the hidden layer may have no direct connection with the outside world (hence the name "hidden"). They may perform computations and transfer information from the input nodes to the next layers (e.g., another hidden layer or output layer 130). While a feedforward neural network may have a single input layer and a single output layer, it may have zero or multiple hidden layers. Output layer 130 may include a plurality of output nodes that are responsible for computing and transferring information from the network to the outside world, such as recognizing certain objects or activities, or determining a condition or an action.

As shown in FIG. 1, in a feedforward neural network, a node (except the bias node if any) may have connections to all nodes (except the bias node if any) in the immediately preceding layer and the immediate next layer. Thus, the layers may be referred to as fully-connected layers. All connections between nodes may have weights associated with them, even though only some of these weights are shown in FIG. 1. For a complex network, there may be hundreds or thousands of nodes and thousands or millions of connections between the nodes.

As described above, a feedforward neural network may include zero (referred to as a single layer perceptron), or one or more hidden layers (referred to as a multi-layer perceptron (MLP)). Even though FIG. 1 only shows a single hidden layer in the multi-layer perceptron, a multi-layer perceptron may include one or more hidden layers (in addition to one input layer and one output layer). A feedforward neural network with many hidden layers may be referred to as a deep neural network. While a single layer perceptron may only learn linear functions, a multi-layer perceptron can learn non-linear functions.

In the example shown in FIG. 1, node 112 may be a bias node having a value of 1 or may be a regular input node. Nodes 114 and 116 may take external inputs X1 and X2, which may be numerical values depending upon the input dataset. As discussed above, no computation is performed on input layer 110, and thus the outputs from nodes 112, 114, and 116 on input layer 110 are 1, X1, and X2, respectively, which are fed into hidden layer 120.

In the example shown in FIG. 1, node 122 may be a bias node having a value of 1 or may be a regular network node. The outputs of nodes 124 and 126 in hidden layer 120 may depend on the outputs from input layer 110 (e.g., 1, X1, X2, etc.) and weights associated with connections 115. For example, node 124 may take numerical inputs X1 and X2 and may have weights w1 and w2 associated with those inputs. Additionally, node 124 may have another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to node 124 are shown in FIG. 1, in various implementations, a node may include tens, hundreds, thousands, or more inputs and associated weights.

The output Y from node 124 may be computed by:

$$Y = f(w1 \times X1 + w2 \times X2 + w0 \times \text{bias}), \quad (1)$$

where function f may be a non-linear function that is often referred to as an activation function. When a node has K inputs, the output from the node may be computed by:

$$Y = f(\Sigma_{i=1}^{K} w_i X_i). \quad (2)$$

Thus, the computation on each neural network layer may be described as a multiplication of an input matrix and a weight matrix and an activation function applied on the products of the matrix multiplication. The outputs from the nodes on an intermediate layer may then be fed to nodes on the next layer, such as output layer 130.

The activation function may introduce non-linearity into the output of a neural network node. One example of the activation function is the sigmoid function σ(x), which takes a real-valued input and transforms it into a value between 0 and 1. Another example of the activation function is the tanh function, which takes a real-valued input and transforms it into a value within the range of [−1, 1]. A third example of the activation function is the rectified linear unit (ReLU) function, which takes a real-valued input and thresholds it above zero (e.g., replacing negative values with zero). Another example activation function is the leaky ReLU function.

Output layer 130 in the example shown in FIG. 1 may include nodes 132 and 134, which may take inputs from hidden layer 120 and perform similar computations as the hidden nodes using weights associated with connections 125. The calculation results (Y1 and Y2) are the outputs of the multi-layer perceptron. In some implementations, in an MLP for classification, a Softmax function may be used as the activation function in the output layer. The Softmax function may take a vector of real-valued scores and map it to a vector of values between zero and one that sum to one, for example, for object classification.

As described above, the connections between nodes of adjacent layers in an artificial neural network have weights associated with them, where the weights may determine what the output vector is for a given input vector. A learning or training process may assign appropriate weights for these connections. In some implementations, the initial values of the weights may be randomly assigned. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

Convolutional neural networks (ConvNets or CNNs) may perform convolutions using smaller convolutional filters rather than large matrix multiplications. A same filter may be used for many locations across an input tensor (e.g., an image) when performing the convolution. Learning a set of convolutional filters (e.g., 7×7 matrices) may be much easier and faster than learning a large weight matrix for a fully connected layer. A convolutional neural network may perform operations, such as convolution, non-linearity (or activation) function (e.g., ReLU), pooling or sub-sampling, and classification. Different CNNs may have different combinations of these four main operations, as well as other additional operations. For example, a ResNet-50 network may include network layers that include mostly convolution layers and a few pooling layers, and may also perform residue-add operations for residue learning.

Figure 2:
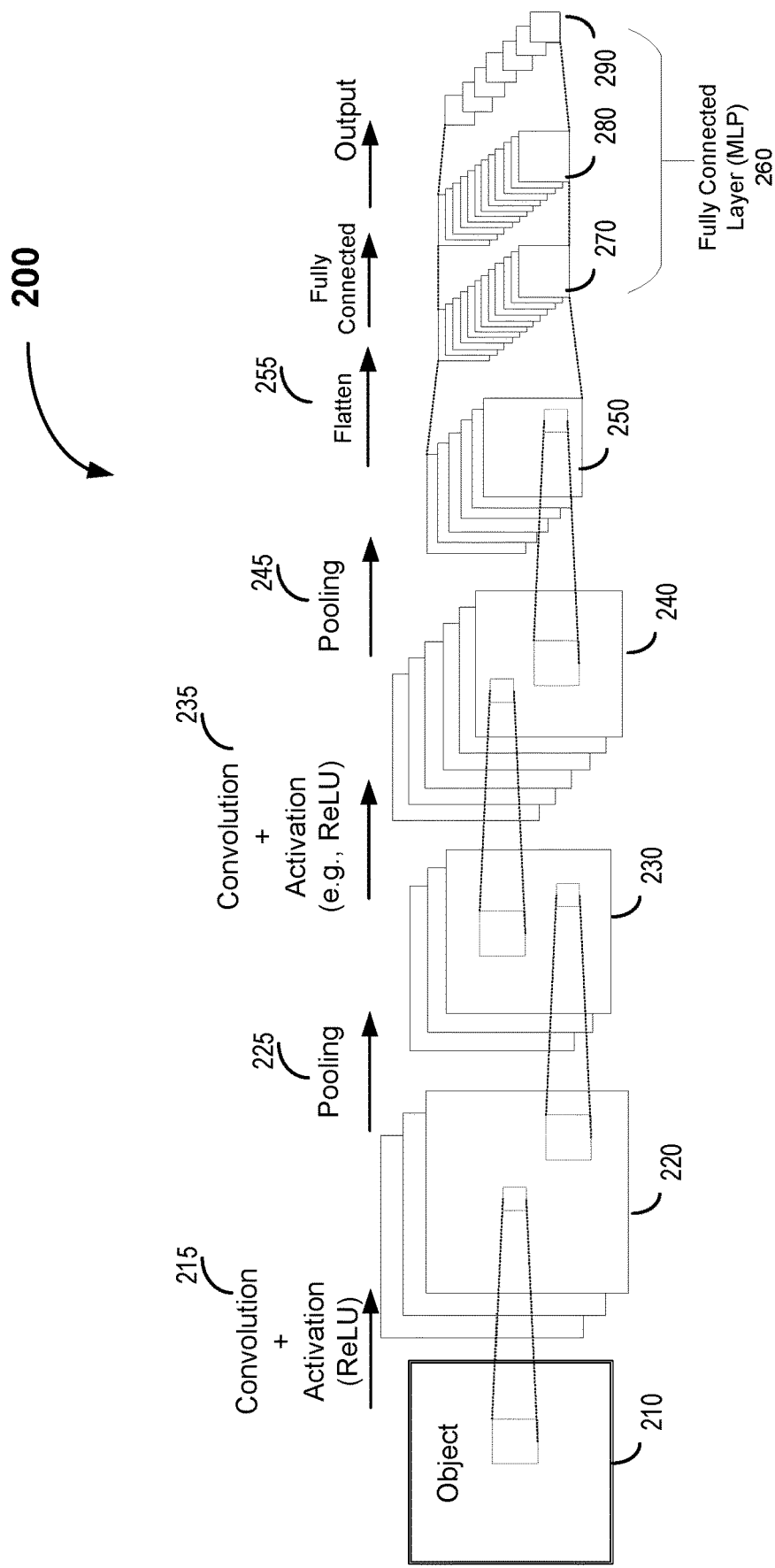
FIG. 2 illustrates an example of a convolutional neural network (CNN)

FIG. 2 illustrates an example of a convolutional neural network (CNN) 200 for classifying images or other objects. As described above, CNN 200 may perform four types of operations including convolution, non-linearity (or activation) function (e.g., ReLU), pooling or sub-sampling, and classification (fully-connected layer). An object 210 to be classified, such as one or more input images or other input datasets (referred to as input feature maps), may be represented by a matrix of pixel values. For example, object 210 may include multiple channels (e.g., multiple input feature maps), each channel representing a certain component of object 210. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 200 is described. Other channels may be processed similarly.

As shown in FIG. 2, object 210 (e.g., an input image) may first be processed by a first convolution layer 215 using a first set of filters, where first convolution layer 215 may perform a convolution between a matrix representing the input image and a matrix representing each filter in the first set of filters. The convolution may include multiple matrix multiplication. First convolution layer 215 may also perform a non-linear activation function (e.g., ReLU). An output matrix 220 from first convolution layer 215 may have smaller dimensions than the input image. First convolution layer 215 may perform convolutions on the input image using the first set of filters to generate multiple output matrices 220, which may be referred to as output feature maps of first convolution layer 215. The number of filters used may be referred to as the depth of the convolution layer. In the example shown in FIG. 2, first convolution layer 215 may have a depth of three. Each output matrix 220 (e.g., an output feature map) may be passed to a pooling layer 225, where each output matrix 220 may be subsampled or down-sampled to generate a matrix 230.

Each matrix 230 may be processed by a second convolution layer 235 using a second set of filters. A non-linear activation function (e.g., ReLU) may also be performed by the second convolution layer 235 as described above. An output matrix 240 (e.g., an output feature map) from second convolution layer 235 may have smaller dimensions than matrix 230. Second convolution layer 235 may perform convolutions on matrix 230 using the second set of filters to generate multiple output matrices 240. In the example shown in FIG. 2, second convolution layer 235 may have a depth of six. Each output matrix 240 may be passed to a pooling layer 245, where each output matrix 240 may be subsampled or down-sampled to generate an output matrix 250.

The output matrices 250 from pooling layer 245 may be flattened to vectors by a flatten layer 255, and passed through a fully-connected layer 260 (e.g., a multi-layer perceptron (MLP)). Fully-connected layer 260 may include an input layer 270 that takes the 2-D output vector from flatten layer 255. Fully-connected layer 260 may also include a hidden layer and an output layer 290. Fully-connected layer 260 may classify the object in the input image into one of several categories using feature maps or output matrix 250 and, for example, a Softmax function. The operation of the fully-connected layer may be represented by matrix multiplications. For example, if there are M nodes on input layer 270 and N nodes on hidden layer 280, and the weights of the connections between the M nodes on input layer 270 and the N nodes on hidden layer 280 can be represented by a matrix W that includes M×N elements, the output Y of hidden layer 280 may be determined by Y=X× W.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in CNN 200 shown in FIG. 2, three distinct filters are used in first convolution layer 215 to perform convolution operations on the input image, thus producing three different output matrices 220 (or feature maps). Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 2, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tanh or sigmoid function, can also be used, but ReLU has been found to perform better in many situations.

Spatial pooling (also referred to as subsampling or downsampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 2, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 200, may be similar to the training process for any feedforward neural network. For example, all parameters and weights (including the weights in the filters and weights for the fully-connected layer) may first be initialized with random values (or the parameters of a known neural network in transferred learning). Second, the convolutional neural network may take a training sample (e.g., a training image) as input, perform the forward propagation steps (including convolution, non-linear activation, and pooling operations, along with the forward propagation operations in the fully-connected layer), and determine the output data (e.g., classification results). Since the parameters of the convolutional neural network, such as the weights, are randomly assigned for the training example, the actual output data of the neural network may not match the expected output data.

The actual output data and the expected output data may be compared to generate loss gradients, which may indicate a rate of change of a cost function or loss function (e.g., based on a difference between the actual output data and the expected output data) with respect to each parameter (e.g., weight) of the neural network layer to be trained. Based on the gradients and a learning rate, the parameters to be trained may be adjusted, for example, using an adaptive gradient algorithm, root mean square propagation, adaptive moment estimation (Adam) optimization algorithm, and the like. The backward propagation operation may be performed for each neural network layer from the output layer, through the intermediate layers, and to the input layer.

At the end of the training process, all weights and parameters of the CNN may have been optimized to correctly generate expected output data for input data of the training samples in the training dataset. If the training dataset is sufficient, the trained network may correctly generate output data, such as correctly classifying an unseen sample into a correct class. The trained neural network model may then be compiled into various levels of representations, including instruction code that may be executed by a processing unit and/or other circuits.

Figure 3:
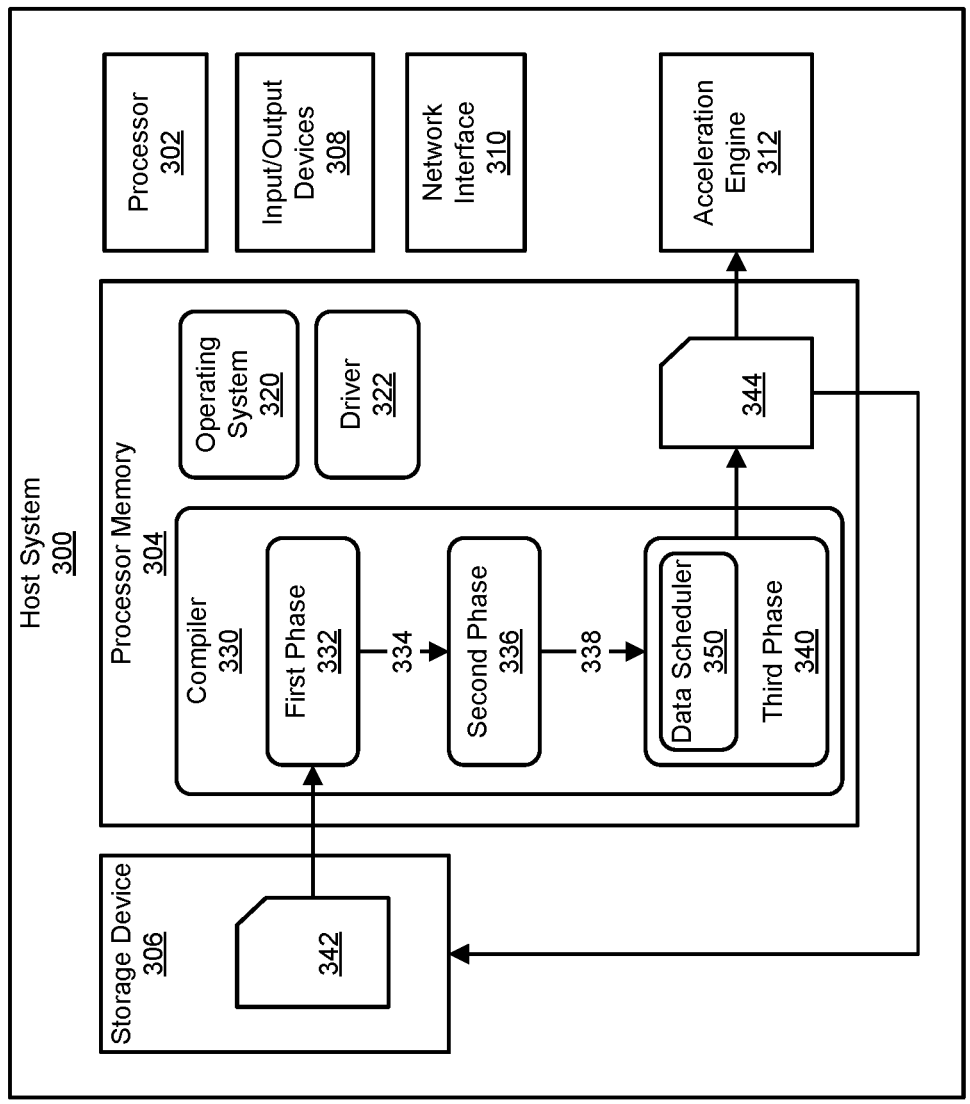
FIG. 3 illustrates a block diagram of an example of a host system on which a compiler can run according to certain embodiments.

FIG. 3 includes a block diagram illustrating an example of a host system 300 on which a compiler 330, such as is described herein, can run. The illustrated host system 300 is an example of a computing device, and includes a processor 302, a processor memory 304, at least one storage device 306, various Input/Output (I/O) devices 308, and at least one network interface 310. In the example of FIG. 3, the host system 300 also includes an acceleration engine 312, which is an integrated circuit device that can accelerate certain operations or computations performed by the host system 300. In various examples, the host system 300 can be implemented as a server in a data center, a desktop computer, a laptop computer, a tablet computer, or a smartphone, among other examples. In some examples, operations or components discussed below as being performed or included in the host system 300 can be performed or included in other computer devices. For example, the compiler 330 can execute on the host system 300 while the acceleration engine 312 is located at a different host system.

The processor 302 is an integrated circuit device that can execute program code, in the form of instructions. The program code can be for various software applications or tools, such as an operating system 320 or the illustrated compiler 330. While the processor 302 is executing a program, the instructions for the program can be stored in the processor memory 304. The instructions can also be stored elsewhere, such as on the storage device 306, and can be loaded into the processor memory 304 when needed by the processor 302. The processor 302 can also use the processor memory 304 for temporary storage of other data on which the processor 302 is operating. In various examples, the processor memory 304 is a volatile memory type, such as a type of Random Access Memory, though non-volatile memory types can, alternatively or additionally, be used for the processor memory 304.

The storage device 306 is an example of a device that can include non-volatile memory. For example, the storage device 306 can be a magnetic disk drive, a solid state drive, or an optical drive, among other examples. The storage device 306 can further be non-transitory, such that program code and other data stored on the storage device 306 remains present when the storage device 306 is not powered on.

The storage device 306 is one example of a peripheral device, which are components that can be coupled to the host system 300 to add functionality to the host system 300. Other examples of peripheral devices include the Input/Output devices 308 and the network interface 310. The Input/Output devices 308 can include user input and output devices, such as keyboards, mice, touch screens, microphones, display screens, speakers, printers, and scanners, among other examples. The network interface 310, which can be implemented using a network interface card, can provide access to one or more networks. The network interface 310 can include, for example, a physical port for connecting a network cable and/or wireless antennas for communicating with Wi-Fi and/or cellular networks. The network interface 310 can also be described as an I/O device.

The acceleration engine 312 is also another type of peripheral device or I/O device. The acceleration engine 312 is a device that is purpose-built to perform certain operations that can be performed by the processor 302, but can be performed faster by the acceleration engine 312. For example, the acceleration engine 312 can be a neural network accelerator, and, as such, may be able to perform the large scale, parallel computations of a neural network more efficiently than when the computations are performed by the processor 302. As another example, the acceleration engine 312 can be a graphics processing unit (GPU), and may be optimized to perform the computations needed for graphics rendering. Other examples of devices that can be implemented by the acceleration engine 312 include cryptographic accelerators, compression and decompression accelerators, 3-D accelerators, regular expression accelerators, security accelerators, and others.

In various examples, the acceleration engine 312 can execute program code to perform certain operations. For example, when the acceleration engine 312 is a neural network accelerator, the acceleration engine 312 can be programmed to execute a particular neural network, such as one that performs image recognition or one that performs machine translation. As a further example, to support the execution of a neural network, the acceleration engine 312 can be programmed to perform operations such as copying data for the neural network from processor memory 304 (for example) into the acceleration engine 312, copying input data for the neural network from processor memory 304 into the acceleration engine 312, and/or copying results from the acceleration engine 312 into the processor memory 304, among other examples.

To generate program code for the acceleration engine 312, in various examples, the host system 300 can execute the compiler 330. Compilers, in general, are software programs that translate program code written in a human-readable language into a format (e.g., machine instructions) that can be read and processed by an integrated circuit device. In the example of FIG. 3, the acceleration engine 312 is a neural network accelerator and the compiler 330 is for compiling a neural network description into instructions to be executed by the acceleration engine 312. When the acceleration engine 312 implements a different type of accelerator, another compiler can be used.

The compiler 330 can be activated, for example, when the operating system 320 receives keyboard, mouse, touch-screen, voice commands, or other inputs from the Input/Output devices 308. The inputs can further include parameters for the compiler 330, such as the input code 342 to compile and configuration options for the compilation process. Once the compiler 330 is activated, the processor 302 can load the instructions for the compiler 330 into the processor memory 304, and can execute the instructions.

In the example of FIG. 3, the compiler 330 includes a first stage 332, a second stage 336, and a third stage 340, which each perform different operations to produce compiled code 344. In other examples, the compiler 330 can combine the operations of the first stage 332, second stage 336, and/or third stage 340 into fewer stages, or can divide the operations of one of the stages into multiple stages.

The first stage 332 can receive and process input code 342. The input code 342 can describe a program in a high-level programming language, such as Java, C++, or Tensorflow, among many other examples. The input code 342 can describe, for example, steps to perform image recognition, speech recognition, machine translation, or other operations. The input code 342 can be obtained, for example, from the storage device 306. Alternatively, though not illustrated here, the input code 342 may be located in the processor memory 304 or can be obtained from a network location, using the network interface 310. Processing of the input code 342 can include sorting the operations described in the input code 342 into layers, where the outputs of one layer provide the inputs to a next layer. Processing can also include identifying steps to be performed by the processor 302, rather than by the acceleration engine 312. For example, the processor 302, through the execution of a driver 322, may need to perform steps such as configuring Direct Memory Access (DMA) descriptors for moving data into or out of the acceleration engine 312, among other examples.

The output 334 of the first stage 332 can be organized, for example, in the layers, nodes, and connections between nodes of a neural network. The second stage 336 can perform intermediate processing on this output 334. For example, the operations performed in any one layer, or at any one node in a layer, may be too many for the acceleration engine 312 to perform at the same time. The acceleration engine 312 may, for example, have a limited amount of locale storage space for the data needed for a computation, or the computations may be more than the acceleration engine 312 can perform at one time. In this example, the first stage 332 can break the operations of the layer or node down into smaller operations, which can fit into the acceleration engine's local memory and/or can fit into the computing capacity of the acceleration engine 312. Processing of the output 334 of the first stage 332 can include other steps, such as scheduling, or determining the order in which the acceleration engine 312 and/or processor 302 will perform operations, among other examples.

In various examples, the output 338 of the second stage 336 includes the various steps to be performed by components of the acceleration engine 312, in the order that the steps are to be performed. The output 338 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 340 can operate on the output 338 of the second stage 336, and perform various steps before producing the instructions that are to be executed by the acceleration engine 312. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 340 can include a data scheduler 350 to determine the order in which instructions are executed by the acceleration engine 312.

The output of the third stage 340 is compiled code 344, which may include machine instructions in binary format. In some examples, the compiled code 344 can be stored in the processor memory 304. Alternatively or additionally, the compiled code 344 can be copied to the storage device 306 or to a network location. As noted above, the acceleration engine 312 may be located at a different host system, in which case the compiled code 344 can be sent over the network interface 310 to the other host system.

In the example of FIG. 3, the host system 300 can be executing a driver 322, which can also be referred to as a device driver or runtime driver, that manages the acceleration engine 312. The driver 322 can provide an interface between applications executing on the host system 300 (or on another host system) and the acceleration engine 312. For example, the driver 322 can provide an Application Program Interface (API) that defines functions for feeding input data to the acceleration engine 312 and defining the operation to perform on the input data. In this and other examples, the driver 322 can configure the acceleration engine 312 to perform the operation. For example, the driver 322 can identify a neural network that the acceleration engine 312 is to execute, as well as the location in the processor memory 304 or on the storage device 306 where the compiled code 344 for the neural network is located. The driver 322 can further load into the acceleration engine 312 or cause the acceleration engine 312 to load the compiled code 344, can load or cause the acceleration engine 312 to load the input data on which the neural network is to operate, and/or can cause the acceleration engine 312 to being executing on the input data. Once the acceleration engine 312 has finished, the acceleration engine 312 can notify the driver 322, and the driver 322 can deliver a result back to the application that requested the result.

Figure 4:
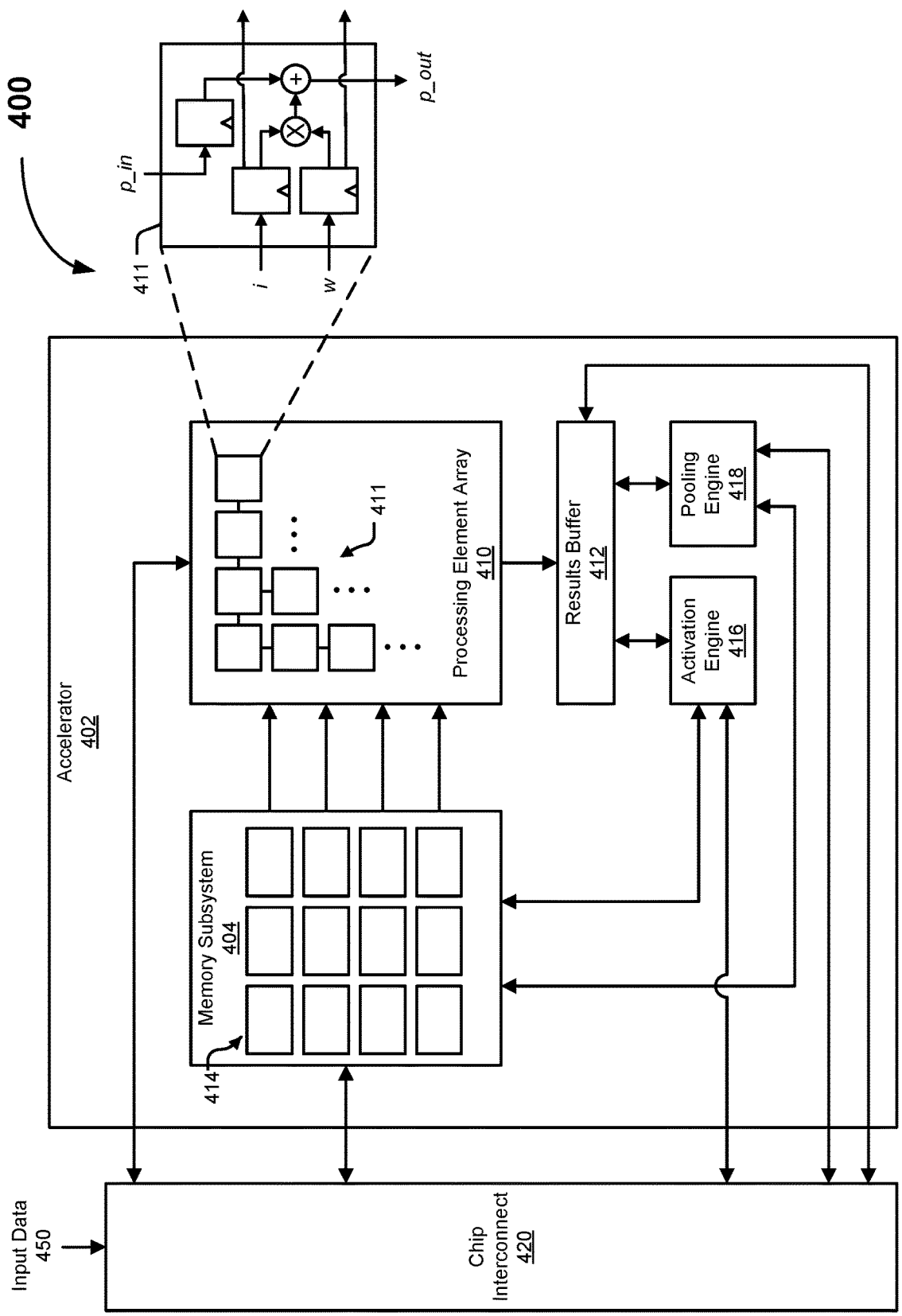
FIG. 4 includes a block diagram of an example of an acceleration engine for implementing a neural network according to certain embodiments.

FIG. 4 is a block diagram illustrating an example of an integrated circuit device that can be used to execute the compiled code of a neural network. The example of FIG. 4 illustrates an accelerator 402, which may be an example of acceleration engine 312. In various examples, the accelerator 402, for a set of input data (e.g., input data 450), can execute computations using a processing element array 410, an activation engine 416, and/or a pooling engine 418. In some examples, the example accelerator 402 may be an integrated circuit component of a processor, such as a neural network processor. The processor may have other integrated circuit components, including additional accelerator engines.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing element array 410, so that the entire processing element array 410 can be in use in one clock cycle. As another example, the memory banks 414 can be read at the same time that results computed by the processing element array 410 are written to the memory subsystem 404. In contrast, a single memory may be able to service only one read or write at a time. With a single memory, multiple clock cycles can be required, for example, to read input data for each row of the processing element array 410 before the processing element array 410 can be started.

In various implementations, the memory subsystem 404 can be configured to simultaneously service multiple clients, including the processing element array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing element array 410 can count as a separate client. In some cases, each column of the processing element array 410 can output a result, such that each column can count as a separate write client. In some cases, output from the processing element array 410 can be written into the memory banks 414 that can then subsequently provide input data for the processing element array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing element array 410, with one memory bank servicing each row. As another example, a set of memory banks can be hard wired to receive values from columns of the processing element array 410, with one memory bank receiving data for each column.

The processing element array 410 is the computation matrix of the example accelerator 402. The processing element array 410 can, for example, execute parallel integration, convolution, correlation, and/or matrix multiplication, among other things. The processing element array 410 includes multiple processing elements 411, arranged in rows and columns, such that results output by one processing element 411 can be input directly into another processing element 411. Processing elements 411 that are not on the outside edges of the processing element array 410 thus can receive data to operate on from other processing elements 411, rather than from the memory subsystem 404.

In various examples, the processing element array 410 uses systolic execution, in which data arrives at each processing element 411 from different directions at regular intervals. In some examples, input data can flow into the processing element array 410 from the left and weight values can be loaded at the top. In some examples weights and input data can flow from the left and partial sums can flow from top to bottom. In these and other examples, a multiply-and-accumulate operation moves through the processing element array 410 as a diagonal wave front, with data moving to the right and down across the array. Control signals can be input at the left at the same time as weights, and can flow across and down along with the computation.

In various implementations, the number of columns in the processing element array 410 determines the computational capacity of the processing element array 410, and the number of rows determines the required memory bandwidth for achieving maximum utilization of the processing element array 410. The processing element array 410 can have, for example, 64 columns and 428 rows, or some other number of columns and rows.

An example of a processing element 411 is illustrated in FIG. 4 in an inset diagram. As illustrated by this example, a processing element 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 411.

In the illustrated example, an input from above can include a partial sum, p_in, provided either from another processing element 411 or from a previous round of computation by the processing element array 410. When starting a computation for a new set of input data, the top row of the processing element array 410 can receive a fixed value for p_in, such as zero. As illustrated by this example, i and w are multiplied together and the result is summed with p_in to produce a new partial sum, p_out, which can be input into another processing element 411. Various other implementations of the processing element 411 are possible.

Outputs from the last row in the processing element array 410 can be temporarily stored in the results buffer 412. The results can be intermediate results, which can be written to the memory banks 414 to be provided to the processing element array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing element array 410 into one or more output activations. For example, for a convolutional neural network, convolutions from multiple channels can be summed to produce an output activation for a single channel. In other examples, accumulating results from one or more columns in the processing element array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing element array 410, and can perform an operation on the outputs of a column, the result of which can be stored in the memory subsystem 404. In these examples, the activation engine 416 may be able to perform between 1 and n parallel computations, where n is equal to the number of columns in the processing element array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing element array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing element array 410. In these examples, the pooling engine 418 may be able to perform between 1 and n parallel computations, where n is equal to the number of columns in the processing element array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing element array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface.

The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, the accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The neural network can also include instructions, which can program the processing element array 410 to perform various computations on the weights and the input data. The instructions can also be stored in the memory subsystem 404, in the memory banks 414 or in a separate instruction buffer. The processing element array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing element array 410 to compute results for the next layer of the neural network. The processing element array 410 can further output final results from a last layer of the neural network. The final results can be stored in the memory subsystem 404 and then be copied out to host processor memory or to another location.

As described above, a neural network layer may perform various operations, such as filtering, linear transformation, non-linear transformation, down-sampling, up-sampling, pooling, and the like, to map an input feature map (e.g., an input tensor) to an output feature map (e.g., an output tensor). These operations may use mathematical operations, such as multiplications, addition, subtractions, divisions, floor divisions, modulo operations, and the like, to index particular elements or slices of a tensor, move particular tensor elements of the input tensor to desired elements or slices in the output tensor, and/or perform mathematical calculations on selected tensor elements or slices. In complex tensor indexing, such as up-sampling or back-propagation training, quasi-affine expressions (e.g., including division or modulo operations) may need to be performed to determine the indices. The quasi-affine expressions may not be efficiently evaluated by accelerator 402 and processing element array 410 that is optimized for matrix multiplication. Thus, the evaluations of the quasi-affine expression by the processing unit may take a longer time or may use more computing resources than evaluating an affine expression. As such, the tensor indexing may not be efficiently performed by the processing unit and may not have fixed delays.

Figure 5:
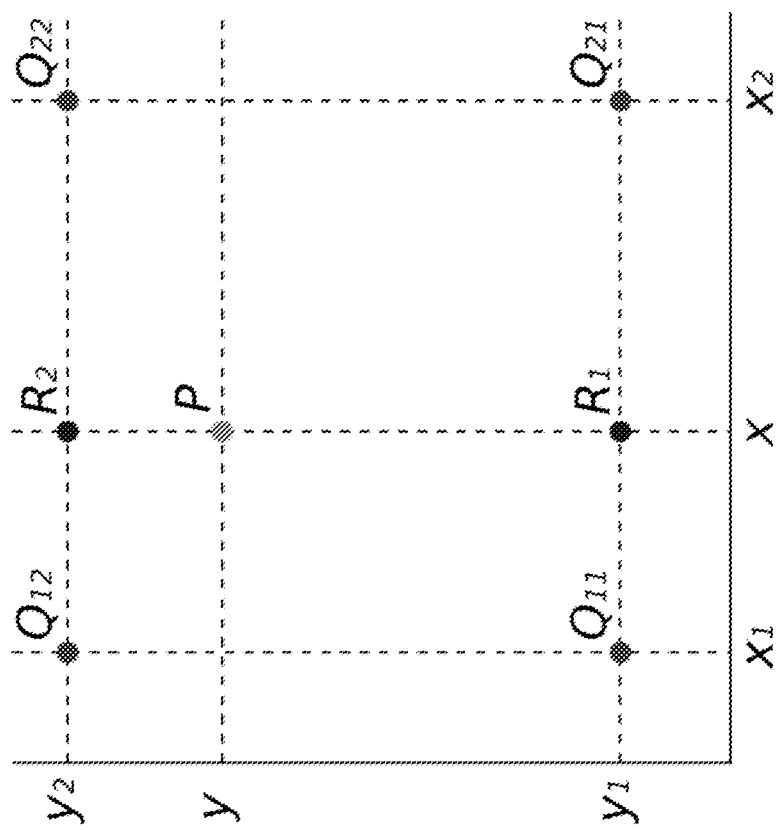
FIG. 5 illustrates an example of an up-sampling operation that may include divisions.

FIG. 5 illustrates an example of an up-sampling operation that may include divisions. In the illustrated example, the values f at four points $Q_{11}=(x_1, y_1)$, $Q_{12}=(x_1, y_2)$, $Q_{21}=(x_2, y_1)$, and $Q_{22}=(x_2, y_2)$ are known, and a bilinear interpolation is performed to determine the value f(x, y) at a point P=(x, y). Bilinear interpolation can be performed first using a linear interpolation in one direction (e.g., the x-direction), and then again in the other direction (e.g., the y-direction). Although the interpolation in each direction is linear, the bilinear interpolation as a whole is quadratic:

$$f(x, y_1) \approx \frac{x_2 - x}{x_2 - x_1} f(Q_{11}) + \frac{x - x_1}{x_2 - x_1} f(Q_{21}),$$

$$f(x, y_2) \approx \frac{x_2 - x}{x_2 - x_1} f(Q_{12}) + \frac{x - x_1}{x_2 - x_1} f(Q_{22}), \text{ and}$$

$$f(x, y) \approx \frac{y_2 - y}{y_2 - y_1} f(x, y_1) + \frac{y - y_1}{y_2 - y_1} f(x, y_2) =$$

$$\frac{1}{(x_2 - x_1)(y_2 - y_1)} [x_2 - xx - x_1] \begin{bmatrix} f(Q_{11}) & f(Q_{12}) \\ f(Q_{21}) & f(Q_{22}) \end{bmatrix} \begin{bmatrix} y_2 - y \\ y - y_1 \end{bmatrix}.$$

As shown by the above equations, a division may be needed to perform the interpolation.

Figures 6A, 6B:
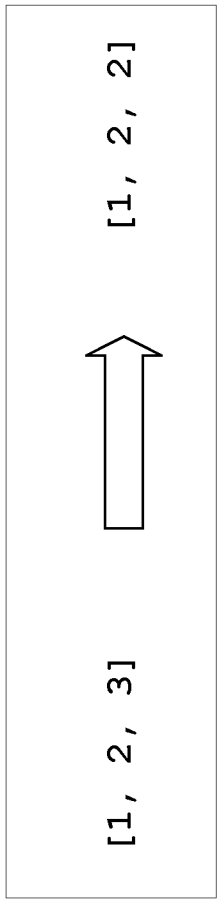
FIG. 6A illustrates an example of tensor indexing.
FIG. 6B illustrates an example of a representation of a tensor indexing that includes floor divisions.

FIG. 6A illustrates a simplified example of tensor indexing. In the illustrated example, the input tensor may be [1, 2, 3] and the output tensor may be [1, 2, 2]. Thus, the first element of the input tensor may be mapped to the first element of the output tensor, and the second element of the input tensor may be mapped to both the second element and the third element of the output tensor.

FIG. 6B illustrates an example of a representation of the tensor indexing of FIG. 6A. The tensor indexing may include floor divisions (2*i+1)//3, where "//" is the floor division operator. When i=0, (2*i+1)//3=0, and thus the first element in the input tensor is mapped to the first element (i=0) of the output tensor. When i=1, (2*i+1)//3=1, and thus the second element in the input tensor is mapped to the second element (i=1) of the output tensor. When i=2, (2*i+1)//3=1, and thus the second element in the input tensor is also mapped to the third element (i=2) of the output tensor.

As described above, operations such as integer divisions, floor divisions, or modulo operations may not be efficiently performed by a systolic array, such as processing element array 410. One technique to avoid using operations such as integer divisions, floor divisions, or modulo operations for the tensor indexing may use a pair of matrix multiplications to map an element in a two-dimensional input tensor to a two-dimensional output tensor, where a first matrix multiplication may be used to map the element to a desired row and a second matrix multiplication may be used to map the element to a desired column in the output tensor. In this way, any element in the input tensor can be mapped to any element in the output tensor using a pair of matrix multiplications.

FIG. 7 illustrates an example of using a pair of matrix multiplications to index a two-dimensional tensor. In the illustrated example, M is the input matrix. Out matrix O(m, n) is a matrix that has 0s at all elements except element O[m, n], which is equal to M[i, j]. A left matrix A(m, i) is a matrix that has 0s in all elements except element A[m, i], which has a value "1". A right matrix B(m, i) is a matrix that has 0s in all elements except element B[j, n], which has a value "1". To map input matrix element M[i,j] to element O[m, n] in output matrix O(m, n), the following pair of matrix multiplications may be used:

$$O(m,n)=A(m,i)\times M\times B(j,n).$$

In one specific example shown in FIG. 7, to map input matrix element M[1, 2] (e.g., "6") to element O[0, 1] in output matrix O, a left matrix A with "1" at element A[0, 1] and "0" at other elements may multiply with input matrix M to move the second row of input matrix M to the first row of an intermediate matrix. The intermediate matrix may then multiply with a right matrix B that has a value "1" at element B[2, 1] and a value "0" at other elements, to move the third element of the first row of the intermediate matrix to the second element of the first row of output matrix O.

In this way, any element in a two-dimensional input tensor can be mapped to any element in a two-dimensional output tensor. To map elements from the input tensor to K elements in the output tensor (e.g., in a gather operator), K pairs of matrix multiplications (i.e., 2K matrix multiplications) may be performed, and then the products may be summed to generate the output tensor. This technique may use matrix multiplications, rather than quasi-affine expression, for the tensor indexing. However, this technique may need many matrix multiplications and accumulations for large tensors, and thus may not be efficient. For example, to randomly index a 9×9 matrix, a total of 9×9×2=162 matrix multiplications may be needed.

According to certain embodiments, the mappings of individual tensor elements may be grouped to reduce the number of matrix multiplications needed. For example, if the left matrices As are the same for the mappings of two or more elements, these elements are mapped from a same row in the input matrix M to a same row in the output matrix O, and thus the right matrices Bs for the mappings of these elements can be added together to form a new right matrix B', such that the mappings can be performed by calculating A×M×B'. Similarly, if the right matrices Bs are the same for the mappings of two or more elements, these elements are mapped from a same column in the input matrix M to a same column in the output matrix O, and thus the left matrices As for the mappings of these elements can be added together to form a new right matrix A', such that mappings can be performed by calculating A'×M×B. In some tensor mapping operations, the grouped mappings can be further grouped or fused. For example, if the left matrices A's for multiple groups of mappings are the same, the right matrix Bs for these groups of mappings may be summed to form a new right matrix B', such that the mapping for a larger group of elements can be performed by A'×M×B'. Similarly, if the right matrices B's for multiple groups of mappings are the same, the left matrices As may be summed to form a new right matrix A', such that the mapping of a larger group of elements can be performed by A'×M×B'. The grouping or fusing can be performed until no groups of mappings share a same left matrix or right matrix.

In certain embodiments, the grouping of the mappings can be made in other ways. For example, if a transformation maps elements in a same row of the input tensor to elements in a same column of the output tensor, or maps elements in a same column of the input tensor to elements in a same row of the output tensor, a matrix transpose may be performed first, followed by one or more matrix multiplications (if needed). Because both the matrix transpose and the matrix multiplications can be efficiently performed by a processing element array and/or other circuits of an accelerator, the transformation can be efficiently performed by the processing element array and other circuits of the accelerator.

FIG. 8A illustrates an example of tensor indexing using matrix multiplications according to certain embodiments. FIG. 8A shows an input tensor 810 (e.g., a 4×4 matrix) and a desired output tensor 820 (also a 4×4 matrix). A transformation from input tensor 810 to output tensor 820 may include mapping elements 812, 814, and 816 of input tensor 810 to elements 822, 826, and 824 of output tensor 820, respectively. Elements 812, 814, and 816 of input tensor 810 are in a same column, while elements 822, 826, and 824 of output tensor 820 are in a same row.

As illustrated in FIG. 8A, a matrix transpose operation may first be performed to transform input tensor 810 to an intermediate tensor 830 (a 4×4 matrix M), where elements 832, 834, and 836 of intermediate tensor 830 correspond to elements 812, 814, and 816 of input tensor 810. Element 832 may be mapped to element 822 by A(1, 3)×M×B(0, 0) or $$\begin{bmatrix} 0 & 0 & 0 & 0 \\ 0 & 0 & 0 & 1 \\ 0 & 0 & 0 & 0 \\ 0 & 0 & 0 & 0 \end{bmatrix} M \begin{bmatrix} 1 & 0 & 0 & 0 \\ 0 & 0 & 0 & 0 \\ 0 & 0 & 0 & 0 \\ 0 & 0 & 0 & 0 \end{bmatrix}.$$

Element 836 may be mapped to element 824 by A(1, 3)×M×B(3, 1) or $$\begin{bmatrix} 0 & 0 & 0 & 0 \\ 0 & 0 & 0 & 1 \\ 0 & 0 & 0 & 0 \\ 0 & 0 & 0 & 0 \end{bmatrix} M \begin{bmatrix} 0 & 0 & 0 & 0 \\ 0 & 0 & 0 & 0 \\ 0 & 0 & 0 & 0 \\ 0 & 1 & 0 & 0 \end{bmatrix}.$$

Element 834 may be mapped to element 826 by A(1, 3)×M×B(2, 2) or $$\begin{bmatrix} 0 & 0 & 0 & 0 \\ 0 & 0 & 0 & 1 \\ 0 & 0 & 0 & 0 \\ 0 & 0 & 0 & 0 \end{bmatrix} M \begin{bmatrix} 0 & 0 & 0 & 0 \\ 0 & 0 & 0 & 0 \\ 0 & 0 & 1 & 0 \\ 0 & 0 & 0 & 0 \end{bmatrix}.$$

The mappings of elements 832, 834, and 836 of intermediate tensor 830 to elements 822, 826, and 824 of output tensor may then be grouped and performed by A(1, 3)×M×{B(0, 0)+B(3, 1)+B(2, 2)} or $$\begin{bmatrix} 0 & 0 & 0 & 0 \\ 0 & 0 & 0 & 1 \\ 0 & 0 & 0 & 0 \\ 0 & 0 & 0 & 0 \end{bmatrix} M \begin{bmatrix} 1 & 0 & 0 & 0 \\ 0 & 0 & 0 & 0 \\ 0 & 0 & 1 & 0 \\ 0 & 1 & 0 & 0 \end{bmatrix}.$$

Therefore, the mapping from input tensor 810 to output tensor 820 may be performed by a transpose operation and a pair of matrix multiplications A(1, 3)×M×{B(0, 0)+B(3, 1)+B(2, 2)}.

FIG. 8B illustrates an example of executing a gather operator using matrix multiplications according to certain embodiments. FIG. 8B shows an input tensor 840 (a matrix N) and an output tensor 850. A transformation from input tensor 840 to output tensor 850 is a gather operation that maps rows 842, 844, 846, and 848 of input tensor 840 to rows 856, 852, 854, and 858 of output tensor 850, respectively. As described above, row 842 can be mapped to row 856 by A(2, 0)×N×{B(0, 0)+B(1, 1)} or simply A(2, 0)×N, which may be the grouping of the mappings of two elements in row 842. Row 844 can be mapped to row 852 by A(0, 2)×N×{B(0, 0)+B(1, 1)} or simply A(0, 2)×N, which may be the grouping of the mappings of two elements in row 844. Row 846 can be mapped to row 854 by A(1, 3)×N×{B(0, 0)+B(1, 1)} or simply A(1, 3)×N, which may be the grouping of the mappings of two elements in row 846. Row 848 can be mapped to row 858 by A(3, 5)×N×{B(0, 0)+B(1, 1)} or simply A(3, 5)×N, which may be the grouping of the mappings of two elements in row 848. Therefore, the gather operation can be the fusion of the groups of the mappings of rows 842, 844, 846, and 848, and thus may be performed by {A(2, 0)+A(0, 2)+A(1,3)+A(3,5)}×N×{B(0,0)+B(1, 1)} or $$\begin{bmatrix} 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \end{bmatrix} N \begin{bmatrix} 1 & 0 \\ 0 & 1 \end{bmatrix},$$

which can be simplified as {A(2, 0)+A(0, 2)+A(1, 3)+A(3, 5)}×N or $$\begin{bmatrix} 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \end{bmatrix} \times N.$$

When many rows of a large matrix are to be gathered, the techniques disclosed herein can significantly reduce the number of matrix multiplications and summations for implementing the gather operator.

FIG. 9A illustrates another example of mapping an input tensor 910 to an output tensor 920. FIG. 9B illustrates an example of representation code for mapping input tensor 910 to output tensor 920. The representation code may be in a programming language, such as Python. FIG. 9C illustrates the matrix multiplications for performing the mapping shown in FIG. 9A and described in the representation code shown in FIG. 9B, according to certain embodiments. In the illustrated example, input tensor 910 may be a 3×3 matrix M, and output tensor may be a 4×4 matrix. The representation code shown in FIG. 9B may include floor divisions for indexing input tensor 910.

A compiler (e.g., compiler 330) may look through the nested "for" loops in the representation code shown in FIG. 9B to determine a list of mappings (e.g., 16 mappings) from elements of input tensor 910 to elements of output tensor 920. Each mapping in the list of mappings may map an element in input tensor 910 to an element in output tensor 920, and may be represented by a pair of matrix multiplications as described above, for example, with respect to FIG. 7. The pair of matrix multiplications may include a first matrix multiplication of a left matrix (e.g., a 4×3 matrix) and matrix M, and a second matrix multiplication of matrix M and a right matrix (e.g., a 3×4 matrix) as described above. The compiler may then group the mappings in the list based on the left matrix and the right matrix of each mapping as described above. For example, the mappings of elements in a same row of input tensor 910 to a same row of output tensor 920 may be grouped together, and a pair of matrix multiplications may be used to perform the mapping of each row of the four rows of output tensor 920. The four groups of mappings of the rows may be further grouped or fused together, such that the four pairs of matrix multiplications for the four rows of output tensor 920 may be combined or fused to yield one pair of matrix multiplications as shown in FIG. 9C.

In many tensor indexing operations, not all element mappings can be grouped into a single group such that the mappings can be performed by one pair of matrix multiplications as shown in FIG. 9C. Thus, the compiler may group the mappings to two or more groups. In some examples of tensor indexing operations, one element mapping can be grouped into two groups, for example, one group for the row the element is in and another group for the column the element is in. The compiler may rank the groups based on, for example, the group size, and then select the largest group first to generate a pair of matrix multiplications. In some embodiments where an element mapping is grouped into two groups, the element mapping that has been covered in a selected large group may be removed from the group that has a smaller size. The compiler may then select the next largest group to generate another pair of matrix multiplications, until all element mappings are covered by the selected groups. In some embodiments, the left matrix or the right matrix of the pair of matrix multiplication may be an identity matrix and thus may not be needed.

Figure 10A:
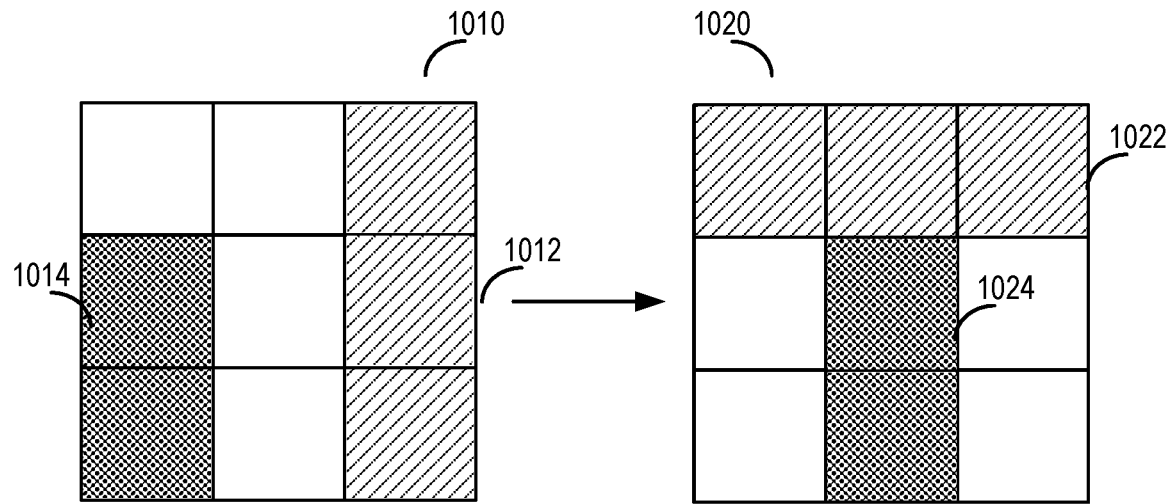
FIG. 10A illustrates an example of mapping an input tensor to an output tensor using matrix multiplications according to certain embodiments.

FIG. 10A illustrates an example of mapping an input tensor 1010 to an output tensor 1020 using matrix multiplications according to certain embodiments. In the example shown in FIG. 10A, elements 1012 in a column of input tensor 1010 may be mapped to elements 1022 in a row of output tensor 1020, and elements 1014 in a column of input tensor 1010 may be mapped to elements 1024 in a column of output tensor 1020. Thus, the list of five mappings for the five tensor elements may be grouped into two groups, where the first group includes the mappings of elements 1012 in a column of input tensor 1010 to elements 1022 in a row of output tensor 1020, and the second group includes the mappings of elements 1014 in a column of input tensor 1010 to elements 1024 in a column of output tensor 1020. The two groups of mappings may need to be performed separately and then the results may be summed together to form output tensor 1020. For example, the first group of mappings may be performed by a transpose operation (and possibly matrix multiplications), whereas the second group of mappings may be performed by one or two matrix multiplications.

Figure 10B:
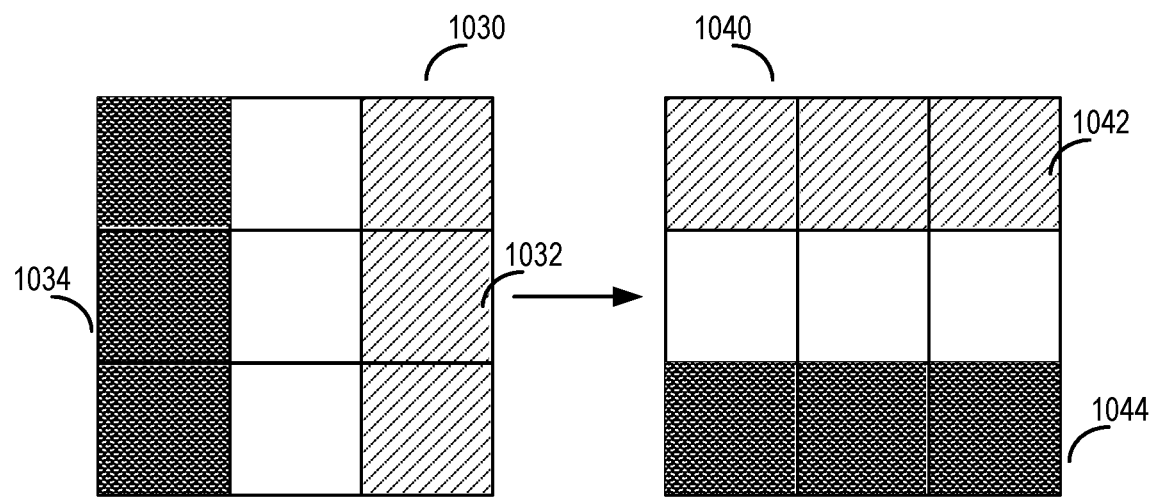
FIG. 10B illustrates an example of mapping an input tensor to an output tensor using a matrix transpose according to certain embodiments.

FIG. 10B illustrates an example of mapping an input tensor 1030 to an output tensor 1040 using a matrix transpose according to certain embodiments. In the example shown in FIG. 10B, elements 1032 in a column of input tensor 1030 may be mapped to elements 1042 in a row of output tensor 1020, and elements 1034 in a column of input tensor 1030 may be mapped to elements 1044 in a row of output tensor 1040. Thus, the mappings may first be grouped into two groups, where the first group includes the mappings of elements 1032 in a column of input tensor 1030 to elements 1042 in a row of output tensor 1040, and the second group includes the mappings of elements 1034 in a column of input tensor 1030 to elements 1044 in a row of output tensor 1040. The first group of mappings and the second group of mappings may be performed by a same transpose operation, and thus can be merged into a larger group.

Figure 11:
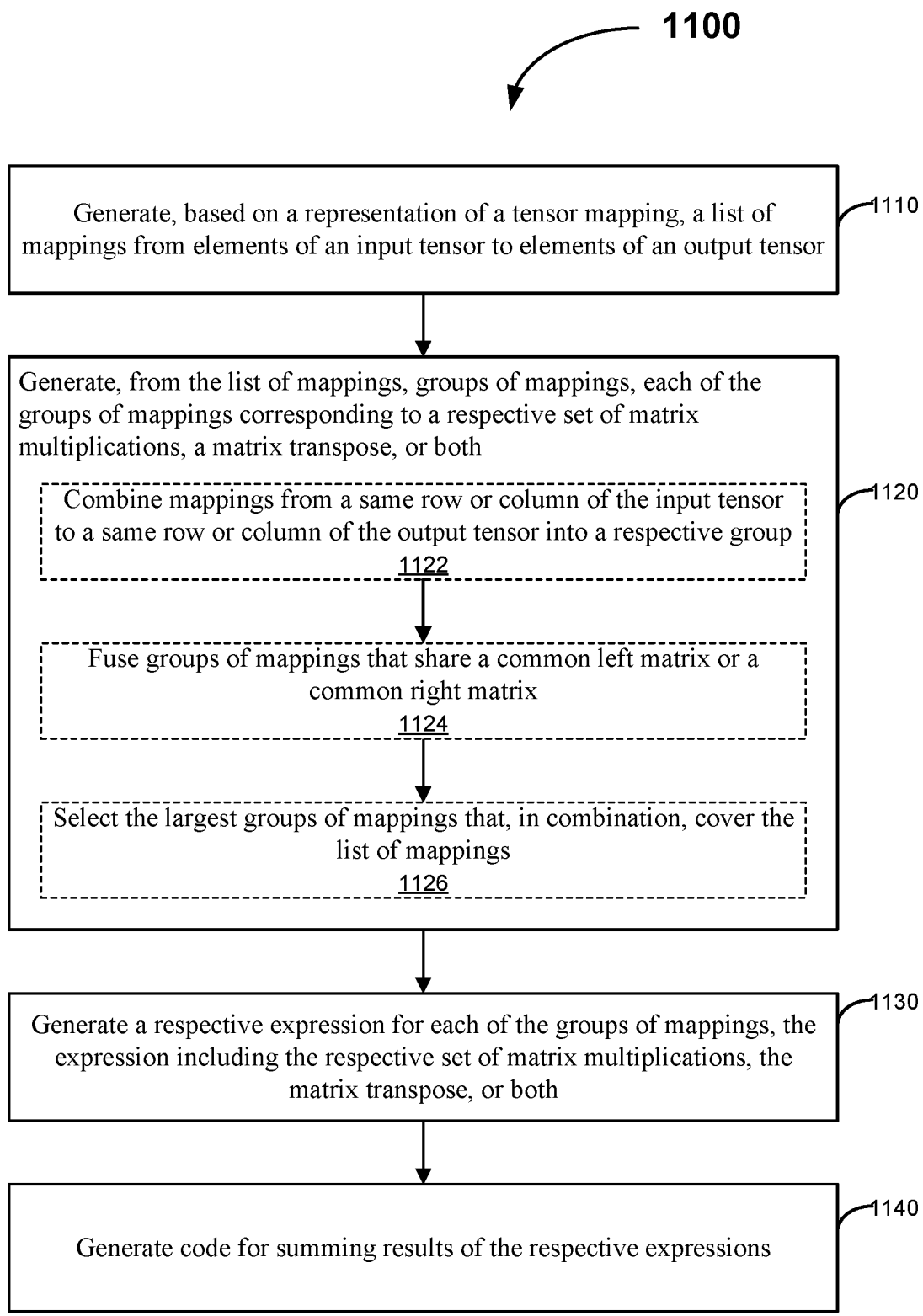
FIG. 11 includes a flowchart illustrating an example of a process for performing tensor indexing using matrix multiplications and/or matrices transposes according to certain embodiments.

FIG. 11 includes a flowchart 1100 illustrating an example of a process for performing tensor indexing using matrix multiplications and/or matrices transposes according to certain embodiments. Operations described in flowchart 1100 may be performed by, for example, a compiler running on a host system, such as processor 302 and compiler 330 on host system 300 described above with respect to FIG. 3. Although flowchart 1100 may describe the operations as a sequential process, in various embodiments, many of the operations may be performed in parallel or concurrently. In addition, the order of the operations may be rearranged. An operation may have additional steps not shown in the figure. Some operations in the process may be optional. Furthermore, embodiments of the process may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

At block 1110 of the process, a compiler may generate, based on a representation (e.g., in a programming language, such as Python) of a tensor mapping, a list of mappings from elements of an input tensor to elements of an output tensor. The tensor mapping may be, for example, part of an up-sampling operation of a neural network or a back-propagation operation of a process for training a neural network. The representation of the tensor mapping may include at least one of an integer division, a floor division, or a modulo operation. For example, the representation of the tensor mapping may include multiple nested loops, where the loops may index the tensor elements using a division (e.g., modulo division) or a modulo operation, as described above with respect to, for example, FIGS. 5, 6B, and 9B. The input tensor and the output tensor may be one-dimensional or two-dimensional tensors, or may be high-order tensors that are linearized to one-dimensional or two-dimensional tensors. The input tensor and the output tensor may have a same number of elements or different numbers of elements. Each mapping in the list of mappings may map an element of the input tensor to an element of the output tensor and may be represented by a pair of matrix multiplications as shown in, for example, FIG. 7. Thus, mapping elements of an input tensor to N elements of an output tensor may include 2N matrix multiplications.

At block 1120, the compiler may generate, from the list of mappings, groups of mappings. Each of the groups of mappings may be performed by a respective set of matrix multiplications, a matrix transpose, or both. In some embodiments, the compiler may generate the groups of mappings by, at block 1122, combining mappings from elements in a respective row or column of the input tensor to elements in a respective row or column of the output tensor into a respective group of mappings. Thus, the respective group of mappings may be performed by one or more matrix multiplications, a matrix transpose, or both. The one or more matrix multiplications may include a first multiplication of a left matrix and the input tensor or a transposed matrix of the input tensor, and a second multiplication of the product of the first multiplication and a right matrix. In some embodiments, the compiler may combine the mappings by combining mappings that are representable by matrix multiplications using a same left matrix or a same right matrix. In some embodiments, the left matrix or the right matrix can be an identity matrix or an exchange matrix.

Optionally, at block 1124, the compiler may further fuse the groups of mappings that share a common left matrix or right matrix to further reduce the total number of groups. For example, if the matrix multiplication representations of two groups of mappings share a same left matrix but have different right matrices, the two groups of mappings may be fused into a larger group of mappings that can be represented by a pair of matrix multiplications that uses the left matrix and a sum of the two different right matrices. Similarly, if the matrix multiplication representations of two groups of mappings share a same right matrix but have different left matrices, the two groups of mappings may be fused into a larger group of mappings that can be represented by a pair of matrix multiplications that uses the right matrix and a sum of the two different left matrices.

Optionally, at block 1126, the compiler may generate the groups of mappings by selecting, from the respective groups of mappings generated at block 1122 or the fused groups of mappings generated at block 1124, a set of largest groups of mappings that, in combination, cover all mappings in the list of mappings. For example, the compiler may rank the groups based on the sizes of the groups and select the largest group. The compiler may then remove the mappings of elements that are already covered in the largest group from other groups. The compiler may rank the remaining groups and select the largest group in the remaining groups. This process can be performed iteratively until all mappings in the list of mappings are covered by the selected groups. In this way, a smallest number of groups may be used for the tensor mapping, and thus a smallest number of matrix multiplications may be needed to perform the tensor mapping.

At block 1130, the compiler may generate a respective expression for each of the groups of mappings. The respective expression may include the respective set of matrix multiplications, the matrix transpose, or both. The respective set of matrix multiplications may include a first multiplication of a left matrix and the input tensor or a transposed matrix of the input tensor. The respective set of matrix multiplications may also include a second multiplication of a right matrix and a product of the first multiplication. In some embodiments, generating the respective expression for each of the groups of mappings may include summing the pairs of matrix multiplications representing the mappings in each of the groups of mappings. In some embodiments, the left matrix or the right matrix may be an identity matrix or an exchange matrix. The generated expressions may be efficiently executed by, for example, a processing element array in an acceleration engine, such as processing element array 410 in accelerator 402.

At block 1140, the compiler may generate code for summing the results of the respective expressions. The code may include summations of matrices. The generated expressions and code may then be executed by a processing unit to perform the tensor mapping.

The process described above can also be used to map elements in tensors having higher dimensions. For example, a three-dimensional tensor may be split or linearized into one or more two-dimensional tensors, and the mappings may be performed on the two-dimensional tensors.

As described above, the generated code or expressions that include matrix multiplications and/or matrix transposes can be efficiently executed by the processing unit that may include a processing element array and other circuits, such as memory devices. For example, as described above with respect to FIG. 4, a matrix multiplication can be efficiently performed by PE array 410. A matrix transpose can be performed by, for example, storing rows of an input matrix into rows of a first memory array in a local memory, sequentially reading columns of the first memory array and writing data read from the columns of the first memory array into rows of a second memory array for storing the output matrix (transposed matrix).

Matrix transpose operations may be performed in a forward propagation operation to map an input tensor to an output tensor as described above with respect to, for example, FIGS. 8A and 10B. Matrix transpose operations may also be performed during the training operation of a neural network. For example, the weight matrix of a neural network layer may be combined with inputs to the neural network layer in a forward propagation operation, but in the backward propagation operation of the neural network layer, a transposed version of the weight matrix may be combined with an input error gradient matrix (received from the next layer) to compute an output error gradient matrix to be propagated to the preceding layer. The transposed version of the weight matrix may also be combined with the weight gradients to adjust the weights. In addition, in cases where the neural network is a convolutional neural network, the intermediate outputs matrix from a forward propagation operation of a neural network layer can be transposed and combined with the input error gradients matrix (received from the next layer) to generate weight gradients in the backward propagation of that neural network layer.

Figure 12:
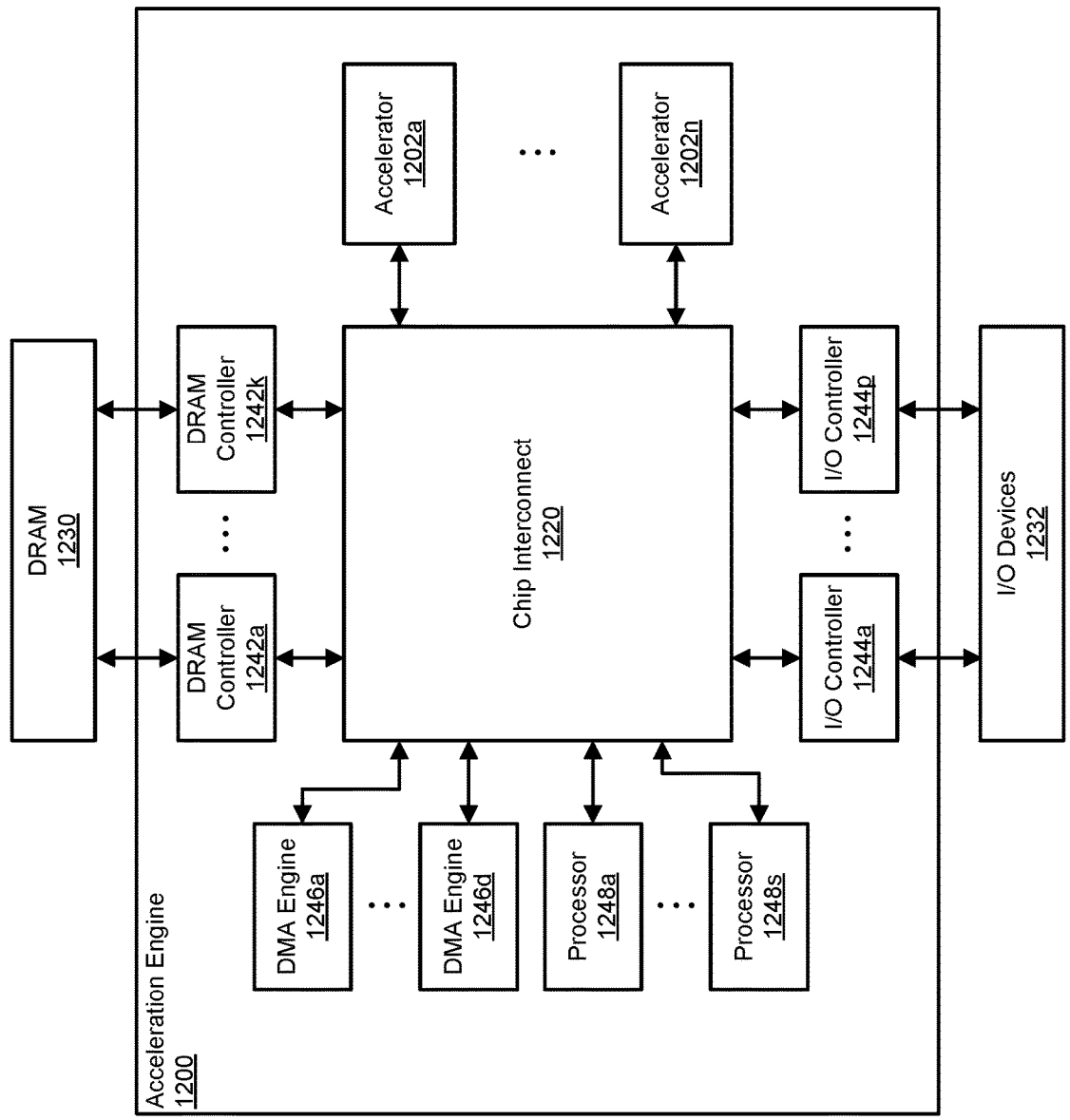
FIG. 12 is a block diagram illustrating an example of an integrated circuit device.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 4.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators 1202a-1202n can be programmed with different programs, so that each performs a different set of operations. In various examples, the processors 1248a-1248s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248a-1248s, which can also be referred to as data management processors. In the example of FIG. 12, the acceleration engine 1200 includes s processors 1248a-1248s incorporated into the device (e.g., on the same silicon die). In other examples, the processors 1248a-1248s can be external to the acceleration engine 1200 (e.g., on a different die and/or in a different package). In some examples, the processors 1248a-1248s can manage the movement of data from I/O devices 1232 to the accelerators 1202a-1202n or the DRAM 1230. For example, input data may be located at an I/O device 1232 or in processor memory, and the processors 1248a-1248s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248a-1248s can be responsible for managing the data movement for a different accelerator. In some examples, a processor may manage the data movement for more than one accelerator. Similarly, in various examples, each of the processors 1248a-1248s can be assigned to one or more DMA engines 1246a-1246d. In these and other examples, associations between processors 1248a-1248s, accelerators 1202a-

1202*n*, and DMA engines 1246*a*-1246*d* are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
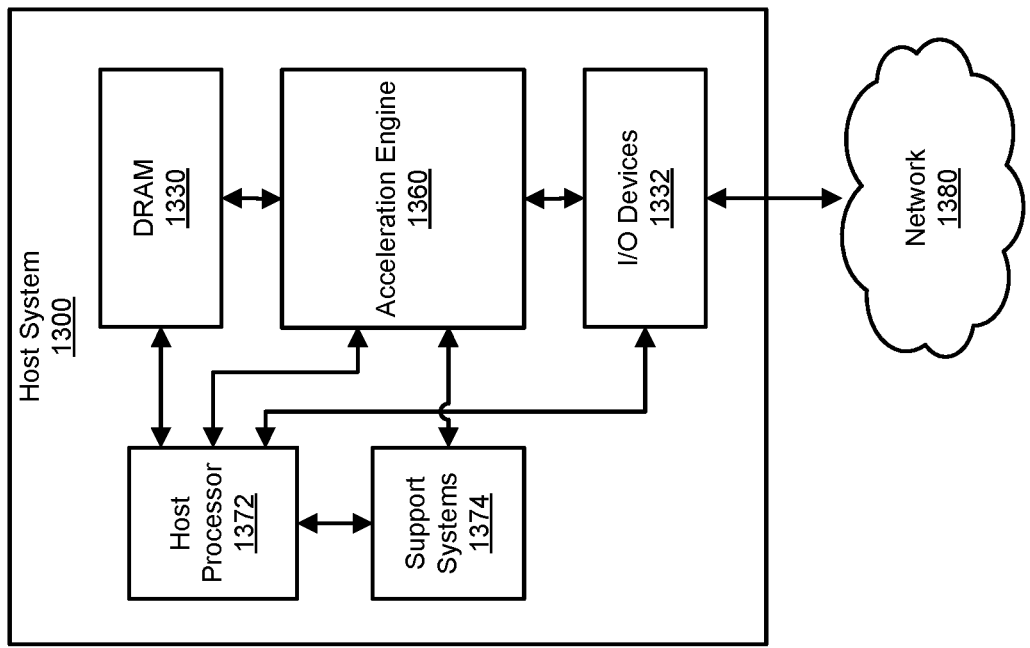
FIG. 13 includes a block diagram that illustrates an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 12. The example host system 1300 of FIG. 13 includes the acceleration engine 1360, a host processor 1372, DRAM 1330 or processor memory, I/O devices 1332, and support systems 1374. In various implementations, the host system 1300 can include other hardware that is not illustrated here.

The host processor 1372 is a general purpose integrated circuit that is capable of executing program instructions. In some examples, the host processor 1372 can include multiple processing cores. A multi-core processor may include multiple processing units within the same processor. In some examples, the host system 1300 can include more than one host processor 1372. In some examples, the host processor 1372 and the acceleration engine 1360 can be one chip, such as, one or more integrated circuits within the same package.

In various examples, the host processor 1372 can communicate with other components in the host system 1300 over one or more communication channels. For example, the host system 1300 can include a host processor bus, which the host processor 1372 can use to communicate with the DRAM 1330, for example. As another example, the host system 1300 can include an I/O bus, such as a PCI-based bus, over which the host processor 1372 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1372 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1372 can manage the movement of data (such as weights, instructions, intermediate results, results of conditional layers, and/or final results) into or out of the acceleration engine 1360.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1330 is memory that is used by the host processor 1372 for storage of program code that the host processor 1372 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1372. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1380. For example, the host system 1300 can use a network interface to communicate with storage devices, user terminals, other computing devices or servers, and/or other networks, among various examples.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1374 can include hardware for coordinating the operations of the acceleration engine 1360. For example, the support systems 1374 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1372. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1374 can be responsible for taking instructions from the host processor 1372 when programs executing on the host processor 1372 request the execution of a neural network. For example, the host processor 1372 can provide the support systems 1374 with a set of input data and a task that is to be performed on the set of input data. In this example, the support systems 1374 can identify a neural network that can perform the task, and can program the acceleration engine 1360 to execute the neural network on the set of input data. In some examples, the support systems 1374 only needs to select an appropriate neural network processing engine of the neural network processor. In some examples, the support systems 1374 may need to load the data for the neural network onto the acceleration engine 1360 before the acceleration engine

1360 can start executing the neural network. In these and other examples, the support systems 1374 can further receive the output of executing the neural network, and provide the output back to the host processor 1372.

In some examples, the operations of the support systems 1374 can be handled by the host processor 1372. In these examples, the support systems 1374 may not be needed and can be omitted from the host system 1300.

In various examples, the host system 1300 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 14:
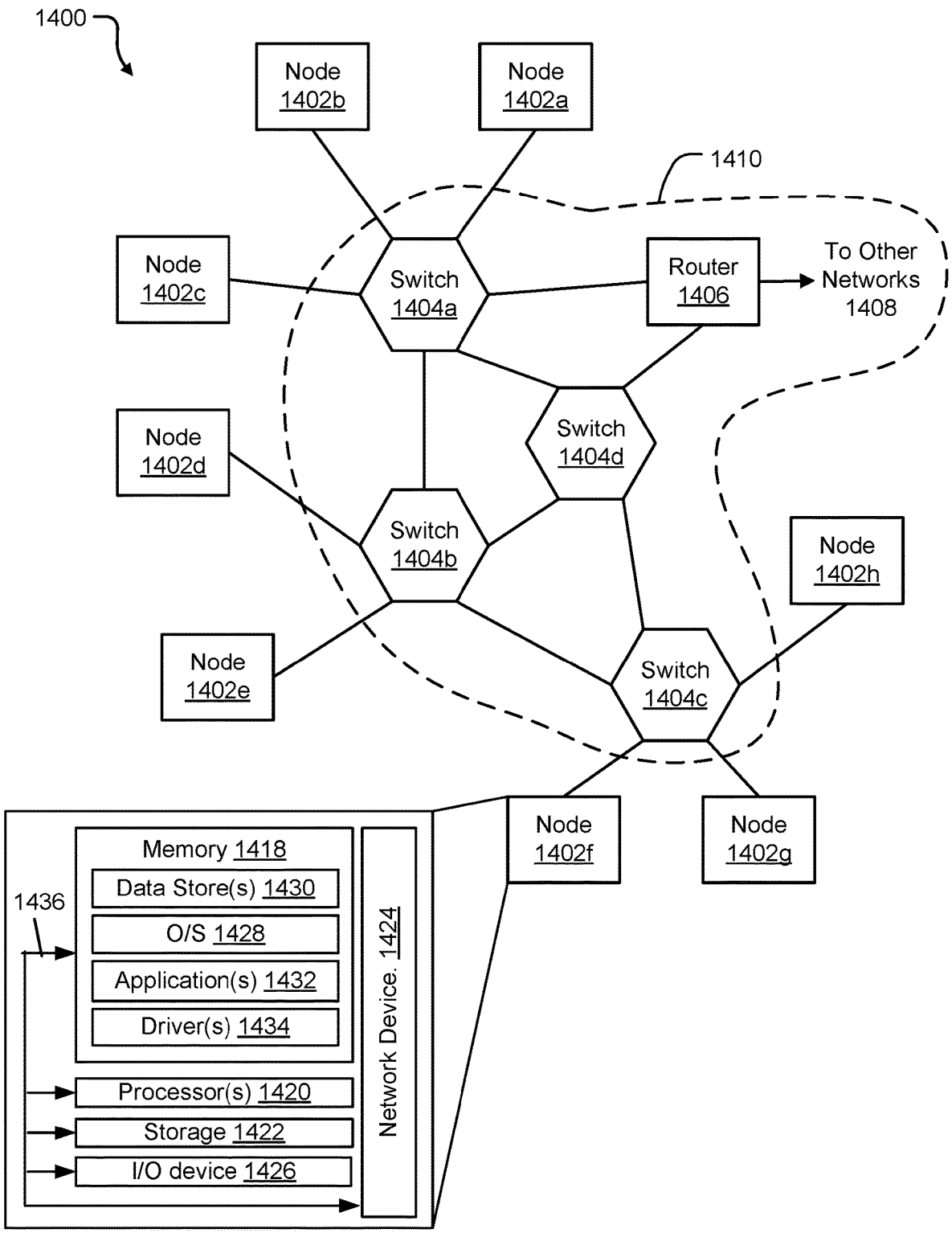
FIG. 14 includes a diagram of an example network.

FIG. 14 includes a diagram of an example network 1400, which can include one or more host systems, such as the host system illustrated in FIG. 13. For example, the example network 1400 of FIG. 14 includes multiple nodes 1402a-1402h, one or more of which can be a host system such as is illustrated in FIG. 13. Others of the nodes 1402a-1402h can be other computing devices, each of which include at least a memory for storing program instructions, a processor for executing the instructions, and a network interface for connecting to the network 1400.

In various examples, the network 1400 can be used to process data. For example, input data can be received at one of the nodes 1402a-1402h or from other networks 1408 with which the network 1400 can communicate. In this example, the input data can be directed to a node in the network 1400 that includes an acceleration engine, for the acceleration engine to operate on and produce a result. The result can then be transferred to the node or other network from which the input data was received. In various examples, input data can be accumulated from various sources, including one or more of the nodes 1402a-1402h and/or computing devices located in the other networks 1408, and the accumulated input data can be directed to one or more host systems in the network 1400. Results from the host systems can then be distributed back to the sources from which the input data was gathered.

In various examples, one or more of the nodes 1402a-1402h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 14, the nodes 1402a-1402h are connected to one another using a switched architecture with point-to point links. The switched architecture includes multiple switches 1404a-1404d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1404a-1404d of FIG. 14 may be connected to the nodes 1402a-1402h and provide multiple paths between any two nodes.

The network 1400 may also include one or more network devices for connection with other networks 1408, such as a router 1406. Routers use headers and forwarding tables to determine the best path for forwarding the packets, and use protocols such as internet control message protocol (ICMP) to communicate with each other and configure the best route between any two devices. The router 1406 of FIG. 14 can be used to connect to other networks 1408 such as subnets, LANs, wide area networks (WANs), and/or the Internet.

In some examples, network 1400 may include any one or a combination of many different types of networks, such as cable networks, the Internet, wireless networks, cellular networks and other private and/or public networks. The interconnected switches 1404a-1404d and the router 1406, if present, may be referred to as a switch fabric 1410, a fabric, a network fabric, or simply a network. In the context of a computer network, terms "fabric" and "network" may be used interchangeably herein.

The nodes 1402a-1402h may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively, or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1424 that allow the node(s) 1402a-1402h to communicate with a stored database, another computing device or server, user terminals and/or other devices on the network(s) 1400.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising, by a computer system including a compiler:
   obtaining program code defining a neural network model, the program code comprising a set of instructions written in a high-level programming language,
      wherein the set of instructions implements a tensor mapping for a back-propagation operation or an up-sampling operation, and
      wherein the tensor mapping maps an input tensor to an output tensor using a division or modulo operation;
   converting the program code into compiled code for execution on a neural network processor, wherein the converting of the program code is performed using the compiler and comprises:
      generating, according to the tensor mapping, a list of mappings from elements of the input tensor to elements of the output tensor;
      dividing the list of mappings into different groups of mappings by:
         combining mappings from elements in a respective row or column of the input tensor to elements in a respective row or column of the output tensor into a respective group of mappings that is representable by at least one of a pair of matrix multiplications or a matrix transpose, wherein the pair of matrix multiplications includes:
            a first multiplication of a left matrix and the input tensor or a transposed matrix of the input tensor; and
            a second multiplication of a product of the first multiplication and a right matrix;
         fusing groups of mappings that share a common left matrix or a common right matrix; and
         selecting the largest groups among the groups of mappings to form a set of groups that, in combination, cover the list of mappings;
      generating a respective expression for each group of mappings in the set of groups, the respective expression including a respective set of matrix multiplications, the matrix transpose, or both, wherein the neural network processor is configured to evaluate the respective expressions more efficiently compared to the division or modulo operation expression; and
      generating, as part of the compiled code, code for computing results of the respective expressions and summing the results of the respective expressions, thereby replacing the division or modulo operation with matrix multiplication or transpose operations; and
   executing the compiled code on the neural network processor, wherein the compiled code is executed to train the neural network model using the back-propagation operation or to up-sample input data using the up-sampling operation.

2. The computer-implemented method of claim 1, wherein:
   the input tensor and the output tensor are one-dimensional or two-dimensional tensors; and
   the input tensor and the output tensor have a same number of elements or different numbers of elements.

3. The computer-implemented method of claim 1, wherein the respective set of matrix multiplications includes one or two matrix multiplications.

4. A computer-implemented method comprising, by a computer system including a compiler:
   obtaining program code defining a neural network model, the program code comprising a set of instructions written in a high-level programming language,
      wherein the set of instructions implements a tensor mapping for a back-propagation operation or an up-sampling operation, and
      wherein the tensor mapping maps an input tensor to an output tensor using a division or modulo operation;
   converting the program code into compiled code for execution on a neural network processor, wherein the converting of the program code is performed using the compiler and comprises:
      generating, according to the tensor mapping, a list of mappings from elements of the input tensor to elements of the output tensor;

dividing the list of mappings into different groups of mappings, each group of mappings corresponding to a respective set of matrix multiplications, a matrix transpose, or both;

generating a respective expression for each group of mappings, the respective expression including the respective set of matrix multiplications, the matrix transpose, or both, wherein the neural network processor is configured to evaluate the respective expressions more efficiently compared to the division or modulo operation; and generating, as part of the compiled code, code for computing results of the respective expressions and summing the results of the respective expressions, thereby replacing the division or modulo operation with matrix multiplication or transpose operations; and executing the compiled code on the neural network processor, wherein the compiled code is executed to train the neural network model using the back-propagation operation or to up-sample input data using the up-sampling operation.

5. The computer-implemented method of claim 4, wherein:

each of the input tensor and the output tensor includes a one-dimensional tensor, a two-dimensional tensor, or a higher dimensional tensor that is representable by one or more two-dimensional tensors; and the input tensor and the output tensor have a same number of elements or different numbers of elements.

6. The computer-implemented method of claim 4, wherein each group of mappings is representable by a pair of matrix multiplications.

7. The computer-implemented method of claim 6, wherein generating the respective expression for each group of mappings comprises summing the pairs of matrix multiplications representing each group of mappings.

8. The computer-implemented method of claim 4, wherein dividing the list of mappings into different groups of mappings comprises:

combining mappings from elements in a respective row or column of the input tensor to elements in a respective row or column of the output tensor into a respective group of mappings that is representable by at least one of a pair of matrix multiplications or a matrix transpose, wherein the pair of matrix multiplications includes a first multiplication using a left matrix and a second multiplication using a right matrix; and fusing groups of mappings that share a common left matrix or a common right matrix.

9. The computer-implemented method of claim 8, wherein combining the mappings comprises combining mappings that are representable by matrix multiplications using the left matrix or the right matrix.

10. The computer-implemented method of claim 8, wherein dividing the list of mappings into different groups of mappings further comprises selecting the largest groups or fused groups of mappings to form a set of groups that, in combination, cover the list of mappings.

11. The computer-implemented method of claim 4, wherein the respective set of matrix multiplications comprises:

a first multiplication of a left matrix and the input tensor or a transposed matrix of the input tensor; and a second multiplication of a product of the first multiplication and a right matrix.

12. The computer-implemented method of claim 11, wherein the left matrix or the right matrix includes an identity matrix or an exchange matrix.

13. A non-transitory computer readable medium having stored therein instructions that, when executed by one or more processors of a computer system including a compiler, cause the one or more processors to perform operations including:

obtaining program code defining a neural network model, the program code comprising a set of instructions written in a high-level programming language, wherein the set of instructions implements a tensor mapping for a back-propagation operation or an up-sampling operation, and wherein the tensor mapping maps an input tensor to an output tensor using a division or modulo operation;

converting the program code into compiled code for execution on a neural network processor, wherein the converting of the program code is performed using the compiler and comprises:

generating, according to the tensor mapping, a list of mappings from elements of the input tensor to elements of the output tensor;

dividing the list of mappings into different groups of mappings, each group of mappings corresponding to a respective set of matrix multiplications, a matrix transpose, or both;

generating a respective expression for each group of mappings, the respective expression including the respective set of matrix multiplications, the matrix transpose, or both, wherein the neural network processor is configured to evaluate the respective expressions more efficiently compared to the division or modulo operation; and generating, as part of the compiled code, code for computing results of the respective expressions and summing the results of the respective expressions, thereby replacing the division or modulo operation with matrix multiplication or transpose operations; and executing the compiled code on the neural network processor, wherein the compiled code is executed to train the neural network model using the back-propagation operation or to up-sample input data using the up-sampling operation.

14. The non-transitory computer readable medium of claim 13, wherein:

each group of mappings is representable by a pair of matrix multiplications; and generating the respective expression for each group of mappings comprises summing the pairs of matrix multiplications representing each group of mappings.

15. The non-transitory computer readable medium of claim 13, wherein dividing the list of mappings into different groups of mappings comprises:

combining mappings from elements in a respective row or column of the input tensor to elements in a respective row or column of the output tensor into a respective group of mappings that is representable by at least one of a pair of matrix multiplications or a matrix transpose, wherein the pair of matrix multiplications includes a first multiplication using a left matrix and a second multiplication using a right matrix; and fusing groups of mappings that share a common left matrix or a common right matrix.

16. The non-transitory computer readable medium of claim 13, wherein the respective set of matrix multiplications comprises:
- a first multiplication of a left matrix and the input tensor or a transposed matrix of the input tensor; and
- a second multiplication of a product of the first multiplication and a right matrix.

* * * * *